United States Patent
Lee et al.

(10) Patent No.: US 12,019,720 B2
(45) Date of Patent: Jun. 25, 2024

(54) SPATIOTEMPORAL DEEP LEARNING FOR BEHAVIORAL BIOMETRICS

(71) Applicant: International Business Machines Corporation, Armonk, NY (US)

(72) Inventors: Taesung Lee, Ridgefield, CT (US); Ian Michael Molloy, Chappaqua, NY (US); Youngja Park, Princeton, NJ (US)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 17/123,821

(22) Filed: Dec. 16, 2020

(65) Prior Publication Data

US 2022/0188390 A1 Jun. 16, 2022

(51) Int. Cl.
*G06F 21/32* (2013.01)
*G06N 3/04* (2023.01)
*G06N 3/08* (2023.01)

(52) U.S. Cl.
CPC .............. *G06F 21/32* (2013.01); *G06N 3/04* (2013.01); *G06N 3/08* (2013.01)

(58) Field of Classification Search
CPC . G06F 21/32; G06N 3/04; G06N 3/08; G06N 3/044
See application file for complete search history.

(56) References Cited

U.S. PATENT DOCUMENTS 8,254,633 B1 * 8/2012 Moon .................... G06V 20/52
382/118
9,720,738 B2 * 8/2017 Anghel ................. G06F 9/5027
(Continued)

FOREIGN PATENT DOCUMENTS

CN       108965585 A     12/2018
CN       111400620 B  *   8/2021 ......... G06F 16/9537
(Continued)

OTHER PUBLICATIONS

Chao Shen, MouseIdentity: Modeling Mouse-Interaction Behavior for a User Verification System, Published in: IEEE Transactions on Human-Machine Systems ( vol. 46, Issue: 5, Oct. 2016), pp. 734-748 (Year: 2016).*

(Continued)

*Primary Examiner* — Shahriar Zarrineh
(74) *Attorney, Agent, or Firm* — Stephen J. Walder, Jr.; Anthony Pallone

(57) ABSTRACT

A behavioral biometrics deep learning (BBDL) pipeline is provided, comprising a plurality of stages of machine learning computer models that operate to provide a behavioral biometric based authenticator operating based on spatiotemporal input data. The BBDL pipeline receives spatiotemporal input data over a plurality of time intervals, each time interval having a corresponding subset of the spatiotemporal input data. For each time interval, machine learning computer model(s) of a corresponding stage process a subset of the spatiotemporal input data corresponding to the time interval to generate an output vector having values indicative of an internal representation of spatiotemporal traits of the entity. Output vectors are accumulated across the plurality of stages of the BBDL pipeline to generate a final output vector indicative of the spatiotemporal traits of the entity represented in the spatiotemporal input data. The entity is authenticated based on the final output vector.

18 Claims, 6 Drawing Sheets

(56) References Cited

U.S. PATENT DOCUMENTS

| | | | |
|---|---|---|---|
| 9,916,538 B2 | 3/2018 | Zadeh et al. | |
| 10,154,810 B2 | 12/2018 | Tzvieli et al. | |
| 10,176,228 B2* | 1/2019 | Bishop | G06F 16/243 |
| 10,832,554 B1* | 11/2020 | Gerard | G08B 21/06 |
| 10,951,606 B1* | 3/2021 | Shahidzadeh | H04W 4/029 |
| 11,005,839 B1* | 5/2021 | Shahidzadeh | H04W 12/06 |
| 11,197,155 B2* | 12/2021 | Breu | G06F 21/32 |
| 11,361,758 B2* | 6/2022 | Baker | G06N 3/084 |
| 2015/0096002 A1* | 4/2015 | Shuart | G06F 21/32 726/7 |
| 2016/0063397 A1* | 3/2016 | Ylipaavalniemi | G16B 40/00 706/12 |
| 2018/0012003 A1* | 1/2018 | Asulin | G06F 21/36 |
| 2018/0129413 A1* | 5/2018 | Berger | G06F 3/0238 |
| 2018/0173986 A1* | 6/2018 | Gousev | G06V 40/193 |
| 2018/0232563 A1* | 8/2018 | Albadawi | A61B 5/1113 |
| 2018/0300625 A1* | 10/2018 | Esman, Sr. | G06N 3/045 |
| 2019/0042745 A1* | 2/2019 | Chen | G06V 20/62 |
| 2019/0044942 A1* | 2/2019 | Gordon | H03M 13/3972 |
| 2019/0068367 A1* | 2/2019 | Baughman | G06F 21/33 |
| 2019/0140833 A1* | 5/2019 | Grajek | H04L 63/0861 |
| 2019/0147849 A1* | 5/2019 | Talwar | G06N 3/02 704/258 |
| 2019/0259378 A1* | 8/2019 | Khadloya | G06N 20/10 |
| 2019/0286990 A1* | 9/2019 | Kenney | G06V 10/803 |
| 2019/0311210 A1* | 10/2019 | Chatterjee | G06N 3/045 |
| 2019/0311261 A1* | 10/2019 | Baldwin | G06N 3/08 |
| 2019/0384431 A1* | 12/2019 | Berger | A61F 4/00 |
| 2020/0059467 A1* | 2/2020 | Chereshnev | H04L 9/50 |
| 2020/0302339 A1* | 9/2020 | Nadamuni Raghavan | G06F 3/0659 |
| 2020/0320390 A1* | 10/2020 | Huang | G06F 18/214 |
| 2021/0158057 A1* | 5/2021 | Scanlin | G06V 20/46 |
| 2021/0400048 A1* | 12/2021 | Liem | G06F 21/316 |
| 2022/0261466 A1* | 8/2022 | Gelardi | H04L 9/3231 |

FOREIGN PATENT DOCUMENTS

| | | | | |
|---|---|---|---|---|
| EP | 3480825 A1 * | 5/2019 | | A61B 5/1124 |
| KR | 20190092765 A * | 8/2019 | | |
| KR | 20220123352 A * | 9/2022 | | |
| WO | WO-2020069154 A1 * | 4/2020 | | A61B 5/0022 |
| WO | WO2020/139259 A2 | 7/2020 | | |
| WO | WO2020/222367 A1 | 11/2020 | | |
| WO | WO-2021167615 A1 * | 8/2021 | | G06F 21/121 |

OTHER PUBLICATIONS

Zae Myung Kim, Modeling long-term human activeness using recurrent neural networks for biometric data, From the 6th Translational Bioinformatics Conference Je Ju Island, Korea. Oct. 15-17, 2016, 15 pages (Year: 2016).*

Abdullah S. Alharthi, Deep Learning for Monitoring of Human Gait: A Review, Published in: IEEE Sensors Journal (vol. 19, Issue: 21, Nov. 1, 2019), Date of Publication: Jul. 15, 2019, pp. 9575-9591 (Year: 2019).*

Joseph Roth, "On Continuous User Authentication via Typing Behavior", Published in: IEEE Transactions on Image Processing (vol. 23, Issue: 10, Oct. 2014), Date of Publication: Aug. 15, 2014, 14 pages (Year: 2014).*

Anonymous, "Method and System for Detecting Identity of User in Real Time by Applying Deep Learning Techniques", IP.com Prior Art Database Technical Disclosure, IP.com No. IPCOM000258783D, Jun. 13, 2019, 2 pages.

Anonymous, "User profiling using key-mouse timing alternation", IP.com Prior Art Database Technical Disclosure, IP.com No. IPCOM000261294D, Feb. 18, 2020, 2 pages.

Gamboa, Hugo et al., "A Behavioural Biometric System Based on Human Computer Interaction", Proceedings vol. 5404, Biometric Technology for Human Identification; (2004), Aug. 25, 2004, 12 pages.

Mahfouz, Ahmed et al., "A Survey on Behavioral Biometric Authentication on Smartphones", arXIV:1801.09308v1 [cs.CR] Jan. 28, 2018, 16 pages.

Yampolskiy, Roman V. et al., "Behavioural biometrics: a survey and classification", Int. J. Biometrics, vol. 1, No. 1, Jan. 2008, 34 pages.

International Search Report and Written Opinion dated Mar. 16, 2022 for International Application No. PCT/IB2021/061560, 9 pages.

* cited by examiner

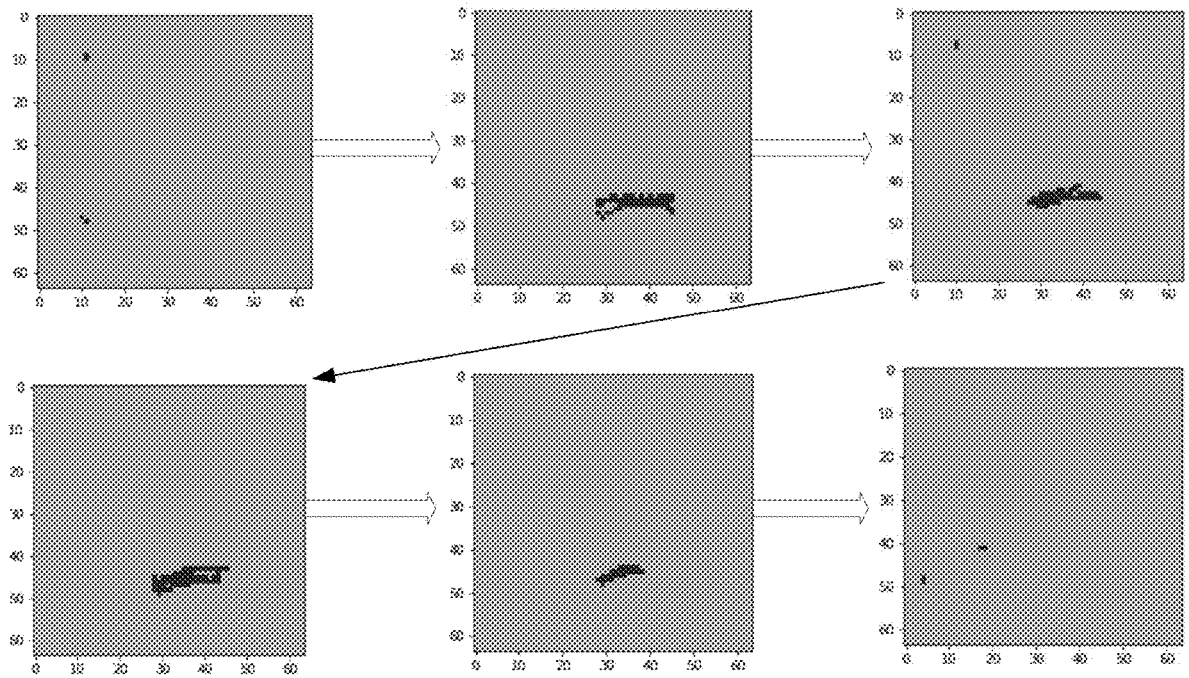
FIG. 1A
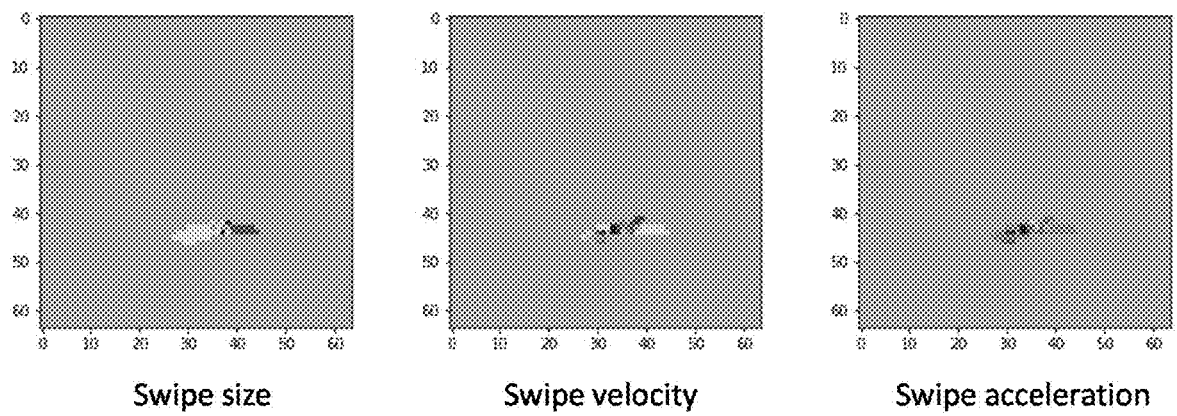
Swipe size
FIG. 1B
Swipe velocity
FIG. 1C
Swipe acceleration
FIG. 1D

SPATIOTEMPORAL DEEP LEARNING FOR BEHAVIORAL BIOMETRICS

BACKGROUND

The present application relates generally to an improved data processing apparatus and method and more specifically to mechanisms for performing spatiotemporal deep learning for behavioral biometrics.

Physical biometrics involves the measurement and analysis of unique physical characteristics, such as fingerprints, voice patterns, DNA, retinal patterns, etc. typically used to verify a person's identity. Behavioral biometrics is an area of study dealing with the measurement of uniquely identifying and measurable patterns in human activities. Examples of behavioral biometrics include keystroke dynamics in which patterns of rhythm and timing created when a person selects keys on a keyboard device, gait analysis, computer mouse use characteristics, signature analysis, and the like. Behavioral biometrics are used in many industries for secure authentication including financial institutions, business, government facilities, retail point of sale (POS) devices, and the like.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the at least one memory comprising instructions executed by the at least one processor to specifically configure the at least one processor to implement a behavioral biometrics deep learning (BBDL) pipeline comprising a plurality of stages of machine learning computer models that operate to provide a behavioral biometric based authentication mechanism that operates based on spatiotemporal input data. In accordance with one illustrative embodiment, the method comprises receiving, from one or more sensors, spatiotemporal input data corresponding to an input associated with an entity over a predetermined time window comprising a plurality of time intervals, each time interval having a corresponding subset of the spatiotemporal input data. The method also comprises, for each time interval in the plurality of time intervals, processing, by one or more machine learning computer models of a corresponding stage in the plurality of stages, a subset of the spatiotemporal input data corresponding to the time interval to generate an output vector having values indicative of an internal representation of spatiotemporal traits of the entity represented in the subset of the spatiotemporal input data. In addition, the method comprises accumulating output vectors, across the plurality of stages of the BBDL pipeline, to generate a final output vector comprising final output vector values indicative of the spatiotemporal traits of the entity represented in the spatiotemporal input data. Furthermore, the method comprises authenticating, by the data processing system, the entity based on the final output vector.

The spatiotemporal input data comprises input data that is both spatially dependent with regard to a physical area monitored by at least one of the one or more sensors, and time dependent. Thus, the BBDL pipeline of the illustrative embodiments does not require a preprocessing of raw spatiotemporal input data to generate a fixed predetermined set of input features and remove temporal characteristics, such as in existing mechanisms. Moreover, the processing of the spatiotemporal input data allows the BBDL pipeline to learn the behavioral biometrics of the entities (users) rather than merely authenticating patterns of input that may be provided by any entity, or multiple entities, that is/are aware of the particular pattern. That is, the spatiotemporal input data is representative of the unique behavior exhibited by the entity/user represented in the manner by which the entity/user generates input and is more than merely a detected pattern.

In some illustrative embodiments, authenticating the entity comprises comparing the final output vector to at least one previously generated output vector, generated by the BBDL pipeline, stored in a user profile for an authorized user to determine a probability that the final output vector represents spatiotemporal traits of the authorized user. Moreover, authenticating the entity further comprises controlling access to protected resources in response to results of the comparison. In this way, a small set of previously generated output vectors may be used to define a user profile representing the behavioral biometrics of an authorized user and subsequent user input may be authenticated against such behavioral biometric data.

In some illustrative embodiments, controlling access to protected resources comprises, in response to determining that the probability indicates that the final output vector represents spatiotemporal traits of the user which match spatiotemporal traits of the authorized user: granting access to the protected resources to the user; and updating the user profile to include the final output vector. In this way, the user profile may be dynamically updated to reflect the most current behavioral biometric information for the authorized user.

In some illustrative embodiments, each stage of the BBDL pipeline comprises an image processing machine learning computer model, and wherein, for each stage of the BBDL pipeline, processing the subset of spatiotemporal input data corresponding to the time interval comprises: processing the subset of spatiotemporal input data to transform spatiotemporal features in the subset of spatiotemporal input data into an image; and performing, by the image processing machine learning computer model of the stage, image analysis on the image to generate a first vector output. In this way, the spatiotemporal features are able to be represented in a format that can be subjected to image analysis by machine learning models so as to classify the spatiotemporal data with regard to various spatiotemporal features.

In some illustrative embodiments, each stage of the BBDL pipeline comprises a fully connected neural network machine learning computer model, and wherein, for each stage of the BBDL pipeline, processing the subset of spatiotemporal input data corresponding to the time interval comprises: processing the subset of spatiotemporal input data to identify temporal features in the subset of spatiotemporal input data; and processing, by the fully connected neural network machine learning model of the stage, the temporal features to generate a second vector output. Thus, temporal features may be identified in the spatiotemporal input data where the temporal features are not dependent upon the particular spatial elements and can be evaluated separately from the spatiotemporal features before being combined with the results of analyzing the spatiotemporal features.

In some illustrative embodiments, each stage of the BBDL pipeline comprises fixed/categorical data embedding logic, and wherein, for each stage of the BBDL pipeline, processing the subset of spatiotemporal input data corresponding to the time interval comprises: processing the subset of spatiotemporal input data to identify fixed/categorical features in the subset of spatiotemporal input data; and processing, by the fixed/categorical data embedding logic of the stage, the fixed/categorical features to generate a third vector output. Thus, the mechanisms of the illustrative embodiments are able to further base the evaluation of the input data based on fixed/categorical data as well as spatiotemporal features and temporal features in the spatiotemporal input data.

In still some illustrative embodiments, each stage of the BBDL pipeline comprises combination logic that operates to combine the first output vector, second output vector, and third output vector to generate a combined output vector that is input to a main stage machine learning computer model of the stage. Thus, the results of processing the spatiotemporal features, temporal features, and fixed/categorical features in the spatiotemporal input data are combined to generate an internal representation of the spatiotemporal features of the input for use in predicting whether or not the spatiotemporal input data is associated with an authorized user or not.

In some illustrative embodiments, each main stage machine learning computer model of each stage of the BBDL pipeline processes a corresponding combination output vector of its corresponding stage along with an input from a previous stage of the BBDL pipeline to generate an stage output vector, and wherein accumulating output vectors, across the plurality of stages of the BBDL pipeline, to generate a final output vector comprises, for each stage, outputting the stage output vector as an input to a next stage in the BBDL pipeline, and wherein a stage output vector of a main stage machine learning computer model of a last stage of the BBDL pipeline is the final output vector. In this way, the processing of spatiotemporal features, temporal features, and fixed/categorical features across multiple time intervals of a window of time is accumulated such that behavioral biometric patterns are able to be identified within the window of time.

In still some illustrative embodiments, embedded device information is input to a main stage machine learning computer model of a first stage of the BBDL pipeline, and wherein the main stage machine learning computer model processes a combination output vector associated with the first stage along with the embedded device information to generate a stage output vector for the first stage. Thus, the evaluation of the BBDL pipeline may be customized to the particular device associated with the spatiotemporal input data.

In one illustrative embodiment, the one or more sensors comprise touch sensors of a touch sensitive display device, and wherein the spatiotemporal input data comprises sensor data indicating characteristics of a touch input of the entity. For example, the mechanisms of the illustrative embodiments may be implemented in conjunction with a touch sensitive display device on many modern electronics, such as smartphones, tablet computers, and the like.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 1A-1D show example plots of spatiotemporal features that may be used for user authentication in accordance with one illustrative embodiment;

DETAILED DESCRIPTION

Figure 1E:
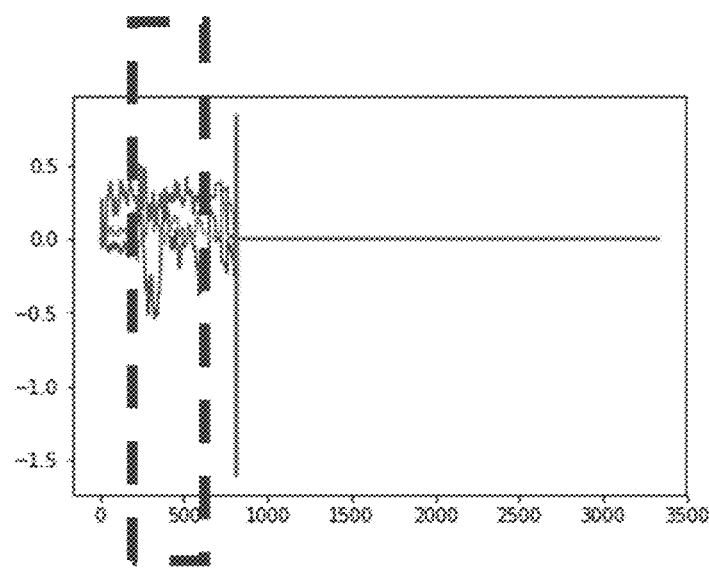
FIG. 1E shows an example plot of temporal features that may be used for user authentication in accordance with one illustrative embodiment.

Behavioral biometrics is an authentication paradigm that allows continuous authentication as opposed to one-time authentication typically employed by physical biometric and knowledge based, e.g., password based, security question based, authentication mechanisms. For example, on a smartphone, tablet device, or the like, different users may have different swiping speed, pinching angle, and the like, which can be monitored by behavioral biometric mechanisms. While mechanisms may exist for using behavioral biometrics as an authentication methodology, because of the limitation of these existing approaches not being able to handle variable length input features, these existing mechanisms only take into consideration predefined features with fixed dimensions eliminating a time dimension.

That is, existing mechanisms require fixed dimensions in order to train computer models to perform predictions or classifications, however the time aspect of behavioral biometrics is variable. Thus, the time aspect of the raw input data must be reduced out of the input data processed by the computer model through a pre-processing or pre-computation on the raw input data in order to generate higher level features that are defined, through feature engineering, to specifically distinguish one entity from another, e.g., a swipe angle feature may be defined which involves computing an angle of a swipe and representing it as a Boolean value depending on a threshold, which can then be used to determine whether the angle of the swipe represents an angular turn or a rounded turn in the swipe, e.g., 1 if the swipe is an angular swipe, or 0 if it is not; 1 if it is a rounded turn, or 0 if it is not. Such features may be able to distinguish users by the types of turns that the users use when performing swipe gestures, but the features themselves do not contain any time aspects or particular spatial information.

It is this pre-processed data, comprising high level entity distinguishing features, which is generated by transforming the raw input data to a fixed dimension input having pre-defined entity distinguishing features with variable timing aspects and/or spatial aspects of the raw input data removed, that is processed by the existing behavioral biometric computer model. Such high level features with fixed dimensions are required due to the limitations of existing behavioral biometric computer models requiring fixed dimension inputs. Thus, existing mechanisms do not perform their behavioral biometric classification operations based on raw spatiotemporal input data, as they cannot take into consideration the variability of the time dimension with regard to behavioral biometrics.

As an example, raw input data from a sensor device, such as for a user's stroke or swipe on a touch sensitive screen, can be a function of time and space $F(t, x, y)=v$ indicating a value of a sensed characteristic of the stroke/swipe at coordinates $(x, y)$ at time $t$ (or alternatively $F(t)=(x, y, v)$, where x is an horizontal coordinate of the screen, y is a vertical coordinate of the screen, t is a time point, and v is a value of a sensed characteristic of the stroke or swipe, e.g., pressure or the like. Existing mechanisms are not able to process such variable input because of the fixed dimension based computer models that must be trained using fixed dimension feature input data. Instead the input data must be converted to fixed dimension user differentiating features through feature extraction transformations implemented by preprocessing of the input data, e.g., Boolean values such as converting $F(t, x, y)=v$ to a Boolean input value by preprocessing the input such that $F(x, y)=1$ or $0$ depending on whether or not the screen is touched at coordinate $(x, y)$, removing the time dimension of the input. That is, through the feature extraction performed based on feature engineering, the feature extraction may generate $F1(session)=|max|F(t, x, y)-avg(F(t,x,y))|-\min|F(t,x,y)-avg(F(t,x,y))|$, which effectively eliminates one or more of the dimensions t and/or x and y. The $max(F-avg(F))$ tells how large a certain feature can be during the session, such as how fast the swiping can be compared to the session average, where a large number means the deviation is large. This equation may be further clarified using the 2-norm instead of the absolute value, e.g., $F1(session)=|max||F(t,x,y)-avg(F(t,x,y))||\_2-\min||F(t,x,y)-avg(F(t,x,y))||\_2$, where "$||\_2$" denotes the 2-norm.

Such preprocessed inputs generate fixed dimension values representing high level features of the input, such as "this user makes a sharp angle", "this user zooms in quickly/slowly", "this user zooms in and out alternatively/repeatedly", etc. which are then fed into the computer model which performs a classification or prediction based on the high level features where spatiotemporal input data has already been removed from the input.

The illustrative embodiments provide a behavioral biometric deep learning (BBDL) computer model pipeline (hereafter referred to as the BBDL pipeline) comprising machine learning image analysis computer models, feature classification machine learning models, feature embedding mechanisms, and the like, which operate to learn patterns of spatiotemporal characteristics of raw spatiotemporal input data, which does not need to remove temporal and/or spatial characteristics to generate high level features as in the existing mechanisms. These learned patterns of spatiotemporal characteristics are indicative of a particular user's behavioral biometrics and generate a user profile based on the machine learned patterns of spatiotemporal features, which can then be used to authenticate subsequent user inputs with regard to the behavioral biometrics represented by the spatiotemporal features of the subsequent user inputs. It should be appreciated that the raw spatiotemporal input to the BBDL pipeline is raw input data that is not designed in itself to be specific entity distinguishing features, i.e. the raw input data is not a pre-processed input data that has been pre-processed to perform feature extraction based on feature engineering and still comprises the raw temporal and spatial information. That is, unlike existing mechanisms where the computer model must operate on specific feature engineered inputs that are specifically engineered to be differentiating of specific entities, the input to the BBDL pipeline is whatever the raw input data happens to be for the particular embodiment, and comprises raw, non-preprocessed, spatiotemporal input data from one or more sensor devices over a particular sliding window of time.

The window of time over which the raw input data is collected and input to the BBDL pipeline is a sliding or moving window of time where each individual time interval may be overlapping or non-overlapping. For example, if a time window comprises time points T1, . . . , T12, the individual time intervals (or time slices) can be (T1, T2), (T2, T3), . . . (T11, T12) or (T1, T3), (T2, T4), (T3, T5), . . . (T10, T12), depending on whether overlapping time intervals are desired for the particular implementation or not. An observable (detectable by one or more sensors) input event from an entity (assumed to be a human user for purposes of illustration, but not limited to such), can occur any time between T1 and T12 in this example. That is, if T1=12:00:10 (hour:minute:second), T2=12:00:15 (based on a wall clock time), a swipe event can happen at 12:00:12 which may associated with a first time interval (T1, T2). By overlapping the time intervals, the possibility of losing information is minimized, e.g., without overlapping two events at 12:00:11 and 12:00:13 would fall in the same time interval, however two events at 12:00:14 and 12:00:16 would fall into two different time intervals despite the same time difference.

Thus, the BBDL pipeline operates on raw spatiotemporal input data that is not directly correlated to particular high level features of an entity behavior. As a result, the mechanisms of the BBDL pipeline may be dynamically trained for new classifications, such as new users, with only a very small set of examples, such as embedding two swipe sessions and comparing the similarity of the embeddings, as described in greater detail hereafter. Contrary to this, existing mechanisms require that the computer model being trained for a fixed set of classifications, or separate trained computer models for different classifications, and if a new classification is desired, one must retrain the entire computer model with the new classification or generate a new computer model.

The BBDL pipeline, in accordance with one illustrative embodiment, comprises multiple stages of computer logic, each stage comprising logic implementing a set of machine learning models (or "sub-models" when one considers the BBDL pipeline as a whole to be a computer "model") that evaluate spatiotemporal features, temporal features, and fixed/categorical features for a particular corresponding time interval comprising time points t, t+1, t+2, up to t+n, where n indicates the size of the time window over which spatiotemporal feature patterns are evaluated to determine behavioral biometrics for a particular user. Thus, the BBDL pipeline will have n stages, each stage having a plurality of machine learning (ML) computer models (or "sub-models" of the overall BBDL pipeline model) that evaluate spatiotemporal features, temporal features, and fixed/categorial features of a user's input to the computing device with which the user is interfacing, as may be generated by one or more sensors of a user input device which is associated with the computing device, and/or generated by the computing device itself, e.g., a plurality of sensors may be provided in association with one or more user manipulated devices, such as a smartphone, tablet computer, touchscreen device, computer mouse, trackball input device, image capturing device, biometric reader device, or any other source of biometric or behavioral biometric input data.

For example, in some illustrative embodiments, these sensors may comprise touch sensors in a touch sensitive screen, accelerometers associated with the device itself, ambient light sensors, camera devices where the input may be expressed in terms of $F(t, x, y)$, and the like. Examples of the spatiotemporal features that are sensed by such sensors and provided as data for input to the BBDL pipeline include, but are not limited to, finger swipe data, e.g., swipe size, swipe velocity, swipe acceleration, swipe directions, etc., on a touchscreen including coordinate data relative to the particular touchscreen dimensions, pressure information regarding touch pressure on a touchscreen device, mouse-over information, detected gesture information from image pickup devices (cameras and the like), touchscreens, or any other source of gesture information, voiceprint information associated with spoken inputs, acceleration information representing movements of the particular device by the user, and the like. In one illustrative embodiment, the spatiotemporal features used include Boolean touch (see description hereafter), touch size (e.g., how large an area around point (x, y) where the value of $F(t, x, y)$ is 1), touch pressure, (x,y) velocity of touch (determined from a sequence of points $\{(t1, x1, y1), (t2, x2, y2), \ldots\}$ where the velocity is $\{(t1, (x2-x1)/(t2-t1), (y2-y1)/(t2-t1), \ldots\}$ and $F(t, x, y)$ and $F'(t, x, y)$ is built from these values), (x,y) acceleration of touch, scalar speed of touch, and scalar acceleration of touch. It should be appreciated that while Cartesian coordinates are used in the examples herein, the illustrative embodiments are not limited to such and any other coordinate system may be utilized without departing from the spirit and scope of the present invention, e.g., $F(t, x, y)$ may be transformed into $F(t, phi, r)$ in order to represent similar information (touch size, velocity, acceleration, etc.) in a polar coordinate system.

In general, the spatiotemporal features are collections of features varying over the input range of the device, e.g., device's screen dimensions or graphical user interface dimensions for touchscreen devices or computer mouse, trackball or other user input device movements representing user input to a graphical user interface or the like, and varying over time. For example, a Boolean spatiotemporal touch feature is a collection of features representing which part of the device screen is touched at a certain time step. Formally, this may be represented as $f\_\{Boolean touch\}(x, y, t)$ where the value is 1 if the device screen is touched at (x,y) on the device screen at timestep t, and 0 otherwise. Thus, for each value of (x,y) for time step t, the value for the spatiotemporal feature is either 1 or 0, thereby generating a matrix or bitmap representation of the user input. In the case of a function $F(t, x, y)=v$, the value for v may not be limited to Boolean values and instead may be within a predefined range of values for v depending on the sensed input, e.g., v may be between max(v) and min(v) (for example 1 and −1).

The use of spatiotemporal features in accordance with the illustrative embodiments is significantly different from prior gesture based authentication mechanisms which disregard location relative to the input range of the device and that the gestures vary over time of the user action (prior gesture based authentication mechanisms are only concerned with high level features that eliminate spatial and/or temporal characteristics as discussed previously). The prior gestured based authentication mechanisms memorize a fixed series of gestures and authenticate based on the same or different series of gestures being input, such that if the input has the exact same series of gestures, the user is authenticated and if not, the user is not authenticated. Hence, anyone that knows the memorized fixed pattern can be successfully authenticated. The illustrative embodiments, on the other hand, use raw input data and operates on minute nuance of user (entity) behaviors that are not associated with fixed patterns. That is, the minute nuances of user behaviors provide a representation of the particular user's spatiotemporal traits, e.g., spatiotemporal user input traits such as a speed of drawing a curve, a zooming angle and trend, and the like, that the user uses with various inputs of the user. These traits are captured with regard to temporal information and are uniquely identifiable to a particular user, rather than being a fixed pattern of non-spatiotemporal features that may be replicated by any user knowing the fixed pattern of inputs.

The illustrative embodiments consider temporal features that are not dependent on the input ranges associated with the particular device, which can be aggregated spatiotemporal information or non-spatiotemporal information associated with user inputs. For example, an accelerometer change does not depend on the particular input range of the device, e.g., dimensions of a device's touchscreen to which the user provides input, but are simply relative to previous measures of acceleration. That is, the change in acceleration will be the same regardless of the input range of the particular device. Formally, $f\_\{accelerometer-x\}(t)$ is the accelerometer changes along the x-axis at timestep t. Such temporal features include, but are not limited to, three-dimensional accelerometer values in Euclidean/polar coordinates, the acceleration first derivative, the acceleration second derivative, aggregated values of the spatiotemporal features, and context embeddings, e.g., which components of the graphical user interface and/or touchscreen were touched.

Moreover, in addition to the spatiotemporal feature input data and temporal feature input data, the illustrative embodiments further obtain data from information sources that are not dependent on biometric data, behavioral biometric data, or other data associated with the user's input. For example, other features that do not depend on such user input specific data, such as the identity of the user manipulated device itself, e.g., make and model number (e.g., Apple iPhone X, Samsung Galaxy S20, etc.), configuration of the device (e.g., sensor types and their characteristics, etc.), dimensions or manipulatable limits of the device (e.g., screen size, touch panel size, graphical user interface size, etc.), the particular application the entity/user interfaces with to provide the input, and the like. These features are ones that do not vary over time, i.e. these are fixed features, but nevertheless are useful in combination with the spatiotemporal features and temporal features for authenticating the identity of a user. Further examples of fixed features that may be used include configuration information indicating ranges of measurable values, e.g., different devices may measure input using different ranges of values, different units, or the like.

These features may be embedded as one or more vector representations of the device itself. Any features that are categorical can be embedded, and the embedded vector provided as an input to the rest of the network of the stage and/or the BBDL pipeline as a whole. Examples of other features that may be embedded in this manner include, but are not limited to, volume, speakerphone on/off, camera status, camera flash status, active/touched application, touched user interface element, device name/type, operating system version, etc.

The sources of feature data, e.g., spatiotemporal features and temporal features, may continuously or periodically collect and/or generate the feature data over multiple time points or time intervals and may provide the feature data to a pre-processor that operates to transform the raw feature data into a form usable by the various machine learning models of the stages of the BBDL pipeline, e.g., time×2D feature matrices or maps for spatiotemporal features, time× 1D matrices or maps for temporal features. In addition, for any fixed device features or categorical type features, embedding of these features may be performed by the pre-processor or other embedding component and the embedded vector representations may be provided along with the outputs of the neural network(s) for downstream processing as discussed hereafter. Embedding is the process of generating a vector representation of an input value. In neural network mechanisms, embedding is a process for generating low-dimensional, learned continuous vector representations of discrete variables. The process of embedding an input into a vector representation is generally known in the art.

In some illustrative embodiments, each stage of the BBDL pipeline comprises one or more first ML computer models (or "sub-models") that are trained through machine learning processes to perform image analysis or computer vision based analysis of the spatiotemporal feature data received from the various sources and pre-processed by the pre-processor into the time×2D feature matrix or map representation. The one or more first ML computer models may comprise a single ML computer model that is trained to perform classification or categorization of a plurality of different spatiotemporal features, may be a single ML computer model that is trained to perform classification or categorization of a single spatiotemporal feature, or may be a combination of a plurality of ML computer models, each trained to perform classification or categorization with regard to a different spatiotemporal feature. In the case of a plurality of ML computer models operating on the spatiotemporal feature data, the results of each ML computer model may be aggregated into a final vector output representation, through merge logic which outputs the final vector output representation to another neural network or machine learning model that generates output to the next stage of the BBDL pipeline, as described hereafter.

It should be appreciated that the training of ML computer models of each stage of the BBDL pipeline may be performed as part of an overall training operation of the entire BBDL pipeline and thus, it is not necessary for each individual model (or "sub-model") of each stage to be pre-trained, although this may be done in some illustrative embodiments. Thus, the BBDL pipeline (or "model") may be trained, which includes training the computer models of each stage (or the "sub-models"), as an overall training operation of the entire BBDL pipeline. It should be appreciated that in some embodiments, one or more of the ML computer models of the stages, or the "sub-models", may be pre-trained of trained as part of a separate machine learning based training operation if desired and training data for training the individual ML computer model, or "sub-model," is available. For ease of description, the ML computer models in each stage of the BBDL pipeline will be referred to as ML computer models rather than "sub-models" hereafter and the BBDL pipeline will be referred to as the BBDL pipeline, rather than the BBDL pipeline ML computer model. However, it should be appreciated that the BBDL pipeline is an overall computer model having the various stages where each stage comprises one or more "sub-models" of the overall BBDL pipeline ML computer model.

The spatiotemporal feature data may be represented as the time×2D feature matrix or map representation which essentially provides an image that may be processed by image analysis or computer vision neural networks or other image/vision analysis machine learning models to generate an output vector representing a categorization of the input image. Examples of image/vision analysis machine learning models, or "sub-models" in each of the stages of the overall BBDL pipeline computer model, include AllConvNet, ResNet, Inception and Xception. The image/vision analysis machine learning models of the illustrative embodiments are specifically trained through machine learning processes to classify or categorize spatiotemporal matrix or map representations with regard to specific behavioral biometric categories. The various categorizations for the various time×2d feature matrices or maps for the various spatiotemporal features may be combined to generate a vector representation of the classifications of the spatiotemporal features present in the inputs for the particular time point or time interval.

In some illustrative embodiments of the present invention, the last logit layer of the image/vision analysis machine learning models may not be used. That is, in a neural network a layer produces features which are then processed by a dense layer to produce a vector with the same dimension as the number of output classes. This is referred to as the logit layer, and a last activation is applied on top of the output generated by the logic layer, e.g., a softmax activation. These last two layers, i.e. the logit and activation layers, in some illustrative embodiments, are not used in the image/vision analysis of the illustrative embodiments, and thus, the input to the logit layer is used as an internal representation of an image for the next stage in the BBDL pipeline.

The temporal features may be represented as a time×1D matrix or map which may be input to one or more second neural networks or trained machine learning computer models that generate a vector output representing a categorization of the temporal features. In some illustrative embodiments, the one or more second neural networks or trained machine learning computer models may be one or more trained fully connected neural networks or other dense layer neural networks. The one or more second neural networks or trained machine learning computer models output one or more vector representations of the classification of the temporal feature inputs for the time interval, which may be combined with the spatiotemporal feature processing machine learning model and other embedded features for features that are fixed or categorical, i.e. non-time dependent, to generate a final vector output that is input to the neural network or machine learning computer model (referred to hereafter as the main stage machine learning (ML) model) that generates output to the next stage of the BBDL pipeline.

It should be appreciated that the output of the models of each stage, and thus each main stage ML model, are internal representations that are learned as part of training the BBDL pipeline as a whole. That is, since the BBDL pipeline tries to classify if two input sessions are from the same user or not, each stage's models will try to extract features that can best represent the user's input image. As these outputs of the stage computer models are internal representations, they are not explicitly/separately trained to generate certain features, but rather are trained as part of an overall machine learning based training of the BBDL pipeline as a whole. The dimension of the output of each main stage ML model is a degree of spatiotemporal trait of the entity (user). For example, suppose that dimension 1 represents a user's spatiotemporal trait of performing several consecutive quick zoom ins and outs to check the detail of something on a smartphone screen (as opposed to a single zoom-in), whereas dimension 2 represents a trait of a single zooming-in. In both dimensions, 1 means that the performer of this input has that trait and 0 means that they do not. The BBDL pipeline accumulates the detected traits of the main stage ML models over a time window. For example, a first main stage ML model may detect a zooming-in, a second main stage ML model may detect a zoom-out, a third main stage ML model may detect another zoom-in, while a fourth main stage ML model may detect a zoom-out. As these detections by the various stages of the BBDL pipeline are accumulated over the time window, the BBDL pipeline determines that dimension 1 should be 1 (not a single zoom-in trait).

In one illustrative embodiment, the main stage ML model for a first stage of the BBDL pipeline receives as an input, an embedding of the device information and/or other fixed or categorial information that is not provided at each time step. For subsequent stages of the BBDL pipeline, the main stage ML model of the previous stage is coupled to a next stage's main stage ML model and provides its output as an input to the next stage's main stage ML model. In one illustrative embodiment, the main stage ML model of each of the stages of the BBDL pipeline may be a recurrent neural network (RNN), such as a long short-term memory (LSTM) RNN.

At each stage along the BBDL pipeline, the corresponding stage ML models perform similar functions as noted above but on the particular spatiotemporal, temporal, and other fixed/categorical features for the corresponding time point or time interval. The resulting output vector of the stage ML models is combined with the input from the previous stage's main stage ML model, in the current stage's ML model as feature inputs that are then processed by that stage's main stage ML model to generate a vector output that is input to the next stage's main stage ML model. This process continues through a final stage of the BBDL pipeline which then generates an output vector K representing the user input over a window of time with regard to spatiotemporal, temporal, and fixed/categorical inputs. The value of "K" represents the number of values included in the output vector that represent traits of the user input. This output vector K is unique to the particular user's behavioral biometric features and thus, can be used to authenticate the user.

In one illustrative embodiment, training of the machine learning models of the stages of the BBDL pipeline may be performed using any suitable machine learning process, e.g., supervised or unsupervised machine learning processes. It should be appreciated that while the BBDL pipeline comprises a plurality of machine learning models of various stages, the BBDL pipeline machine learning training is performed with regard to the BBDL pipeline as a whole.

In general, machine learning is concerned with the design and the development of techniques that take as input empirical data (such as network statistics and performance indicators), and recognize complex patterns in these data. One pattern among machine learning techniques is the use of an underlying model M, whose parameters are optimized for minimizing the cost function associated to M, given the input data. For instance, in the context of a binary classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used to classify new data points. Of course, this is a simple example for binary classification and other models which perform classification into more than two classes will use other similar techniques.

With the illustrative embodiments, the machine learning process generally involves learning how to represent a particular user's behavioral biometric in terms of the spatiotemporal features, temporal features, and fixed/categorical features of their user input. The machine learning process in general involves, for each iteration of each epoch of machine learning training, obtaining a pair of user session information representing user inputs over a particular period or window of time. The pair of user session information involves a first set of session information that corresponds to the target user. The second session information in the pair may be from the same or a different user. Corresponding label information is obtained for the second session information that indicates whether the user is the same user or a different user. The first and second session information are each separately processed through the BBDL pipeline to generate corresponding K-dimensional output vectors. The K-dimensional output vector for the first session information is compared to the K-dimensional output vector for the second session information to determine if the session information is classified by the BBDL pipeline to be the same or different users, i.e. if the session information for both sessions is determined to be sufficiently similar as to represent the same user or not.

This resulting determination may then be compared to the label for the second session information to determine if the second session information is in fact from the same or different users. If the similarity result is incorrect based on the label of the second session information, then the operational parameters of the machine learning models are adjusted so as to reduce errors in the K values generated by the BBDL model. That is, if the similarity comparison indicates that the users for the two sessions are the same user, and they are not the same as indicated by the label of the second session information, then the operational parameters of the machine learning models are adjusted so that the K values generated are different for different users. If the similarity comparison indicates that the users for the two session are not the same, and they are the same as indicated by the label of the second session information, then the operational parameters of the machine learning models are adjusted so that the K values generated are more similar for different sessions with the same user. If the similarity comparison indicates that the users for the two sessions are the same, and they are the same as indicated in the label of the second session information, then no adjustments are needed. It should be appreciated that this process is repeated for different second session information for the same and/or different users, such as may be provided in training data for training the BBDL pipeline's machine learning models.

Once trained, the BBDL pipeline may be executed on one or more user sessions of the target user to generate an authorized user profile that stores one or more K value outputs of the BBDL pipeline representing user inputs of the authorized user for the specific device. For example, a user's historical session information may be obtained for a plurality user sessions and each of these may be processed by the BBDL pipeline to generate K-dimensional output vectors for each session that are stored in the user profile. This group of user sessions, i.e. the user historical sessions, may be a continuously updated set of user historical sessions, e.g., the last 10 sessions may be maintained, and the corresponding user profile may be dynamically updated as new sessions with the user occur. That is for each subsequent user session, the BBDL pipeline executes on the input data from the user session to generate a corresponding K-dimensional output vector which is then used to replace the oldest K-dimensional output vector entry in the user profile. Thus, a dynamic user profile is maintained for the authorized user.

Whether or not new user input information for a new session is in fact from the authorized user or not may be determined in a similar manner as previously described with regard to the training the BBDL pipeline by determining if the K-dimensional output vector for the new user input information is sufficiently similar to K-dimensional output vector information stored in an authorized user's profile, where "sufficiently similar" may be determined relative to a predetermined threshold indicating an amount of difference that is acceptable while still indicating the two K-dimensional output vectors to be representative of the same user (entity). In response to the comparison of the user's profile with the K-dimensional output vector for the new user input information resulting in a determination that they are not sufficiently similar, the user is denied access to computing resources, physical premises, or any other resources protected by the behavioral biometric authentication mechanisms of the illustrative embodiments. In addition, during runtime operation, a determination of the new user information for the new session being from the authorized user, in addition to resulting in access being permitted to the protected resources, may cause an update engine to update the user profile with the K-dimensional output vector for this new session, such as by replacing an oldest K-dimensional output vector entry in the user profile if a predetermined number of K-dimensional output vector entries are present in the user profile.

Thus, the illustrative embodiments provide mechanism for implementing a spatiotemporal deep learning mechanism for behavioral biometrics. The illustrative embodiments provide a pipeline of stages comprising a set of machine learning models for each stage which classify or categorize input data for corresponding time points or time intervals with regard to spatiotemporal features, temporal features, and fixed/categorical features. In some illustrative embodiments, the spatiotemporal features are rendered as image data which is then processed by trained image analysis or computer vision analysis machine learning models, while temporal features are processed through a fully connected and/or dense layer based machine learning model. Stages of the pipeline operate on the user input data for their corresponding time point or time interval as well as the output from the previous stage in the pipeline to ultimately generate a K-dimensional output vector that represents the behavioral biometrics of the user input over the time window or time period processed by the pipeline. This can be used to generate a user profile which can then be used with subsequent user sessions to authenticate the user.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the mechanisms of the illustrative embodiments provide a behavioral biometrics deep learning (BBDL) pipeline comprising a plurality of stages of machine learning computer models that process input data with regard to spatiotemporal features, temporal features, and fixed/categorical features at various time steps or time intervals of a time window to thereby characterize the input data as a vector representation that can be used to generate a user profile and/or compare to a user profile to authenticate a user. The BBDL pipeline comprises a data pre-processor that takes raw behavioral biometric data and converts the data to a format useable by the machine learning models of the stages of the BBDL pipeline. For example, the pre-processor converts the spatiotemporal features present in the raw input data into time×2D feature matrices or maps. The preprocessor also converts the temporal features of the raw input data into time×1D feature matrices or maps. Moreover, the preprocessor may itself, or in conjunction with a separate embedding engine, embed fixed/categorical input data into a vector representation of embedded values for use with the outputs of the other machine learning models of the corresponding stage of logic of the BBDL pipeline.

FIGS. 1A-1D show example plots of spatiotemporal features that may be used for user authentication in accordance with one illustrative embodiment. The plots of these spatiotemporal features, in these examples, are referred to as time×2D feature plots and represent the two-dimensional behavioral biometric features of the user input over time. Each time×2D feature plot in FIGS. 1A-1D comprises a time dimension along the horizontal axis with the two-dimensional (2D) characteristics of the spatiotemporal feature being plotted as a point along the vertical axis representing a first characteristic and a shade or color representing the other characteristic of the 2D characteristics. The particular 2D characteristics plotted are dependent upon the particular spatiotemporal feature being plotted. As can be seen from FIGS. 1A-1D, the plot of the spatiotemporal feature results in an image representing the spatiotemporal feature over time.

In the depicted time×2D feature plots of FIGS. 1A-1D represent spatiotemporal features associated with a swipe user input on a touchscreen of a user manipulated device, such as a smartphone, tablet computing device, or the like. FIG. 1A is time sequence of a time×2D feature plot for the swipe user input. The x- and y-axes correspond to the (x, y) coordinate on the touchscreen of the user manipulated device and thus, constitute a 2D plot. Each plot represents the user's input at a particular time point or time interval. Shadings of the pixels in the 2D feature plot represent a value of a feature at the particular coordinate, where the particular values and value meanings are dependent on the particular feature being represented, e.g., Boolean touch may be a 1 or 0 (represented by two different colors) at a particular coordinate, velocity may be a real number represented by different shadings over a spectrum of possible shadings (e.g., from white to black), etc.

The time×2D feature plot in FIG. 1B represents the 2D characteristics of swipe size plotted versus time. In the plot of FIG. 1B the 2D characteristics may be a value indicating the range or area of pixels around a given pixel that are touched by the user at the particular time point or time interval.

The time×2D feature plot in FIG. 1C represents the 2D characteristics of swipe velocity plotted versus time. In the plot of FIG. 1C the 2D characteristics may include the swipe velocity may be an x component of the velocity, while another plot (not shown) may represent a y component of the velocity. The shading in the plot may represent positive/negative values where the signs are with respect to the particular axis. In the depicted figure, the shading of pixels indicates that the left half of the motion is going from left to right (positive direction with respect to the x-axis) and the right half is going from right to left (negative direction with respect to the x-axis). Thus, the depicted motion is a pinching motion, such as when a user is trying to zoom-out on a touchscreen. Similar to the above, the time×2D feature plot in FIG. 1D represents the 2D characteristics of swipe acceleration plotted versus time.

The raw sensor data is provided as raw input data to the preprocessor which performs operations to convert the spatiotemporal features into the time×2D matrices or maps which are images representing the individual spatiotemporal features. The image data generated by the preprocessor as a result of its matrix or map generation of the time×2D feature plots may then be input to the image analysis/computer vision machine learning model(s) of the corresponding stage of the BBDL pipeline. There may be a single image analysis/computer vision ML model for each spatiotemporal features, or a single image analysis/computer vision ML model that handles image analysis/computer vision operations for a plurality of spatiotemporal feature matrices/maps.

In addition, as mentioned previously, the preprocessor may also convert the temporal features in the input data to time×1D feature matrices or maps. These are features in the input data that do not vary over the input range(s) of the device, e.g., over the locations of the touchscreen, as noted above, but do vary over time. Thus, a time×1D feature matrix or map may be used to represent these temporal features plotting time and a single dimension feature, i.e. a value of the corresponding temporal feature. FIG. 1E shows an example plot of temporal features that may be used for user authentication in accordance with one illustrative embodiment. Again, the horizontal axis represents time, while the vertical axis represents the value of the temporal features, such as an x-axis of an accelerometer recording. The dashed lined box represents a sliding window of time for sampling the temporal features. The time×1D matrices or maps may be input into a fully-connected or dense layer based machine learning model that generates a vector output representing the temporal feature. The output of the fully-connected/dense layer based machine learning model may be combined with the output of the image analysis/computer vision machine learning model(s) and the embedding of the fixed/categorical input data to generate a combined vector output representation of the user input for the time point or time interval, which can then be provided to the main stage ML model as input for processing.

Figure 2:
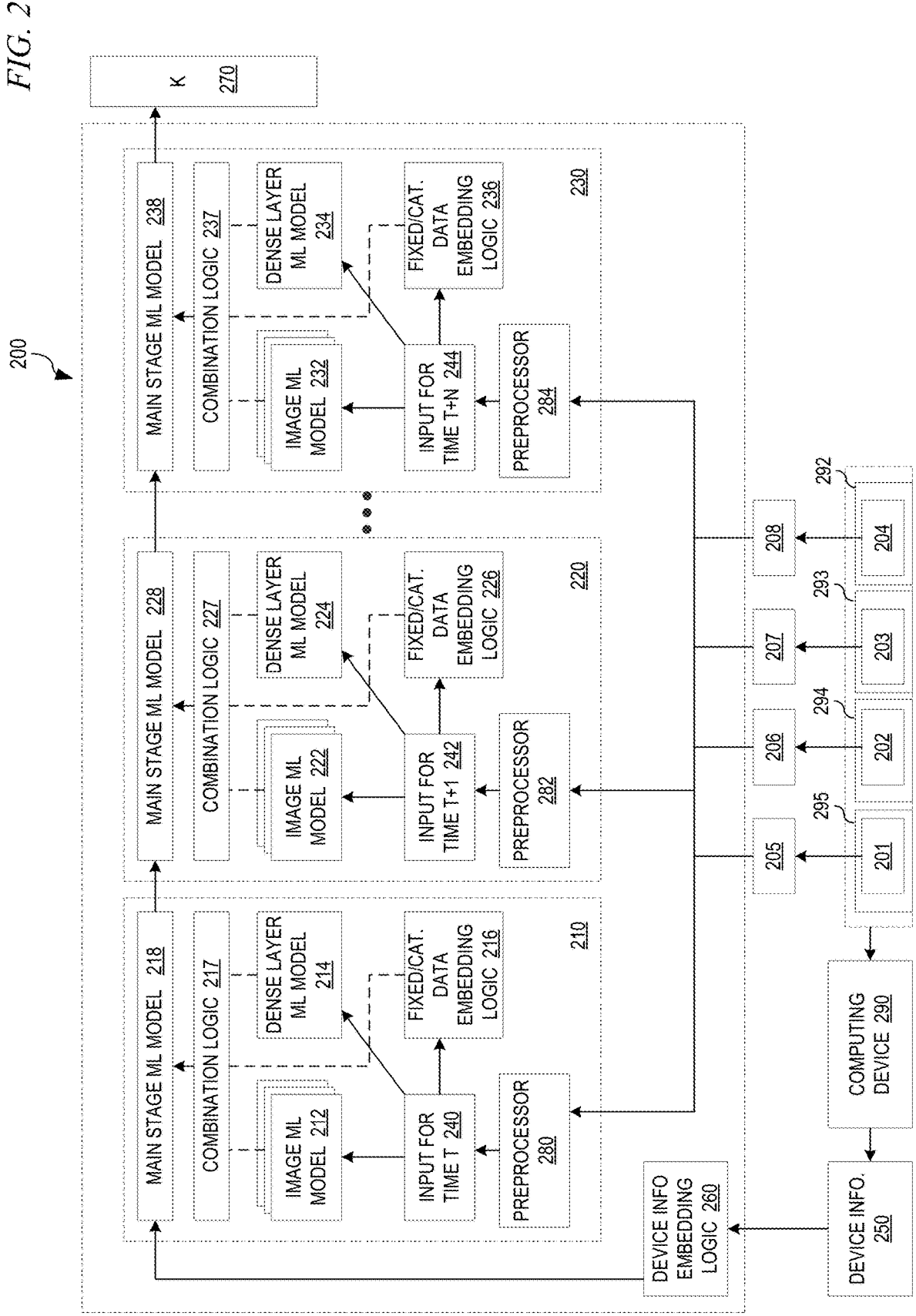
FIG. 2 is an example block diagram of a behavioral biometrics deep learning (BBDL) pipeline in accordance with one illustrative embodiment.

FIG. 2 is an example block diagram of a behavioral biometrics deep learning (BBDL) pipeline in accordance with one illustrative embodiment. As shown in FIG. 2, and previously described above, the BBDL pipeline 200 comprises multiple stages 210-230, each stage 210-230 comprising a set of machine learning models 212-218, 222-228, and 232-238 that evaluate spatiotemporal features, temporal features, and fixed/categorical features for a particular corresponding time interval comprising one or more time points, e.g., t, t+1, t+2, up to t+n, where n indicates the size of the time window over which spatiotemporal feature patterns are evaluated to determine behavioral biometrics for a particular user. Thus, the BBDL pipeline 200 will have n stages, each stage 210-230 having a plurality of trained machine learning (ML) computer models 212-218, 222-228, 232-238 that evaluate spatiotemporal, temporal, and fixed/categorical features of a user's input received via an input device associated with a computing device with which the user is interfacing.

The user input may be captured or gathered by one or more sensors associated with the user input device associated with the computing device, and/or generated by the computing device itself. That is, in accordance with one or more illustrative embodiments, a plurality of sensors 201-204 are provided in association with one or more user manipulated devices (not shown), such as a smartphone, tablet computer, touchscreen device, computer mouse, trackball input device, image capturing device, biometric reader device, or any other source of biometric or behavioral biometric input data. For example, in some illustrative embodiments, these sensors 201-204 may comprise touch sensors in a touch sensitive screen, accelerometers associated with the device itself, and the like. Examples of the spatiotemporal features that are sensed by such sensors 201-204 and provided as part of input data 205-208 for input to the BBDL pipeline 200 include, but are not limited to, finger swipe data, e.g., swipe size, swipe velocity, swipe acceleration, swipe directions, etc., on a touchscreen including coordinate data relative to the particular touchscreen dimensions, pressure information regarding touch pressure on a touchscreen device, mouse-over information, detected gesture information from image pickup devices (cameras and the like), touchscreens, or any other source of gesture information, voiceprint information associated with spoken inputs, acceleration information representing movements of the particular device by the user, and the like. In one illustrative embodiment, the spatiotemporal features used include Boolean touch (see description hereafter), touch size, (x,y) acceleration of touch, scalar speed of touch, and scalar acceleration of touch.

In general, the spatiotemporal features are collections of features varying over the input range of the user interface device 292-294 and/or computing device 290, e.g., device's screen dimensions or graphical user interface dimensions for touchscreen devices or computer mouse, trackball or other user input device movements representing user input to a graphical user interface or the like, and varying over time. Again, as mentioned above, an example spatiotemporal feature may be a Boolean spatiotemporal touch feature that is a collection of features representing which part of the device screen is touched at a certain time step, and may also be a real value feature having various values along a range of potential values, e.g. pressure values or the like. However, it should be appreciated that the spatiotemporal features are not limited to features only able to be sensed by sensors of a user input device and/or computing device. In some illustrative embodiments, other spatiotemporal features may also be evaluated, such as any spatiotemporal features corresponding to a physical area monitored by sensors from which the spatiotemporal data may be obtained, e.g., in the case of ambient light values, the sensors may detect light levels over a window of time and over a particular physical area, and this light level data may represent spatiotemporal input data.

The illustrative embodiments also consider temporal features that are not dependent on the input ranges associated with the particular user input device 292-295 or computing device 290. As noted above, these temporal features may be aggregated spatiotemporal information or non-spatiotemporal information associated with user inputs. Such temporal features include, but are not limited to, three-dimensional accelerometer values in Euclidean/polar coordinates, the acceleration first derivative, the acceleration second derivative, aggregated values of the spatiotemporal features, and context embeddings, e.g., which components of the graphical user interface and/or touchscreen were touched.

In addition, for any fixed device features or categorical type features, embedding of these features may be performed by the preprocessor 280, 282, 284 corresponding to the particular stage 210-230, or other embedding component 216, 226, 236 of the stages 210-230. The embedding components 216, 226, and 236 may be machine learning models trained to embed the corresponding fixed/categorical features into a vector representation representing these fixed/categorical features.

In should be appreciated that the sensors 201-204 provide raw input data 205-208 comprising the spatiotemporal features, temporal features, and fixed/categorical features for each of a plurality of time points or time intervals. These time points or time intervals together represent a time window of user input. The time window of user input may be a moving or sliding window such that the sensors 201-204 continuously monitor user input during a user session. Thus, at a time point/interval t+n+1, the time window processing is started over at stage 210 processing, i.e. time point/interval t+n+1 becomes time point/interval t for the new time window. The time intervals may be overlapping or non-overlapping as previously described above.

Each raw input data 205-208 is provided to the corresponding preprocessor 280, 282, 284 for the particular stage of logic 210-230. The preprocessors 280, 282, 284 generate the timex2D feature matrices/maps, timex1D matrices/maps, and fixed/categorical features that are provided to the corresponding machine learning models of the stage of logic 210-230 as described previously.

In addition to the user input data, device data 250 may be obtained from the computing device 290 and/or user interface device and embedded. For example, other device features that do not depend on such user input specific data, such as the identity of the user manipulated device itself, e.g., make and model number (e.g., Apple iPhone X, Samsung Galaxy S20, etc.), configuration of the device (e.g., sensor types and their characteristics, etc.), dimensions or manipulatable limits of the device (e.g., screen size, touch panel size, graphical user interface size, etc.), and the like, may be embedded as vector representations (embeddings) 260 and provided as input to the main stage ML model 218 of a first stage 210 of the BBDL pipeline 200.

The sensors 201-204 of the user input devices 292-294 and/or the computing device 290, continuously or periodically collect and/or generate the raw input data 205-208 comprising the spatiotemporal features, temporal features, and fixed/categorical features over multiple time points or time intervals and may provide the feature data to corresponding preprocessors 280-284 associated with the stages 210-230 of the BBDL pipeline 200. The preprocessors 280-282 operate to transform the raw user input data into a form usable by the various machine learning models 212-218, 222-228, and 232-238 of the stages 210-230 of the BBDL pipeline 200, e.g., time×2D feature matrices or maps for spatiotemporal features, time×1D matrices or maps for temporal features, and the fixed/categorial features being provided for embedding. The preprocessors 280-282 are configured to identify different types of features present in the raw input data 205-208. That is, the preprocessors 280-284 may parse the raw input data 205-208 and, based on its configuration, categorize portions of the raw input data 205-208 as to whether those portions represent spatiotemporal features, temporal features, or fixed/categorical features. Based on the categorization of the portions of the raw input data 205-208, corresponding processing by the preprocessors 280-284 is performed to generate the time×2D matrices/maps, time×1D matrices/maps, and identification of fixed/categorical features that may be input for embedding. The preprocessed user input data 240-244 is then provided to the corresponding stage 210-230 logic for processing by the machine learning models of the corresponding stage 210-230.

As shown in FIG. 2, each stage 210-230 of the BBDL pipeline 200 comprises one or more first ML computer models 212, 222, 232 that are trained through machine learning processes to perform image analysis or computer vision based analysis of the spatiotemporal feature data present in the preprocessed user input data 240-244 for the corresponding time point/slice. That is, the one or more first ML computer models 212, 222, 232 may comprise a single ML computer model that is trained to perform classification or categorization of a plurality of different spatiotemporal features, may be a single ML computer model that is trained to perform classification or categorization of a single spatiotemporal feature, or may be a combination of a plurality of ML computer models, each trained to perform classification or categorization with regard to a different spatiotemporal features. In the case of a plurality of ML computer models operating on the spatiotemporal feature data, the results of each ML computer model may be aggregated into a final vector output representation, through merge logic (not shown) which concatenates or otherwise aggregates the outputs of the various ML computer models 212 which may then be combined by combinational logic 217, 227, 237 of the stage 210-230 to generate a single final vector output representation to the main stage ML model 218 of the BBDL pipeline 200.

As discussed above, the spatiotemporal feature data may be represented as the time×2D feature matrix or map representation which essentially provides an image that may be processed by image analysis or computer vision neural networks or other image/vision analysis machine learning models to generate an output vector representing a categorization of the input image. The image/vision analysis machine learning models of the illustrative embodiments are specifically trained through machine learning processes to classify or categorize spatiotemporal matrix or map representations with regard to specific behavioral biometric categories. The various categorizations for the various time×2D feature matrices/maps for the various spatiotemporal features may be combined or aggregated to generate a vector representation of the classifications of the spatiotemporal features present in the inputs for the particular time point or time interval.

The temporal features in the preprocessed user inputs 240-244 may be represented as a time×1D matrix or map which may be input to one or more second neural networks or trained machine learning computer models 214, 224, 234 that generate a vector output representing a categorization of the temporal features. In some illustrative embodiments, the one or more second neural networks or trained machine learning computer models 214, 224, 234 may be one or more trained fully connected neural networks or other dense layer neural networks. The one or more second neural networks or trained machine learning computer models 214, 224, 234 output one or more vector representations of the classification of the temporal feature inputs for the time interval, which may be combined by the combinational logic 217, 227, 237 with the output from the spatiotemporal feature processing machine learning model(s) 212, 222, 232 and other embedded features generated by the embedding logic 216, 226, 236 for features that are fixed or categorical, i.e. non-time dependent, to generate a final vector output that is input to the main stage machine learning (ML) model 218, 228, 238 that generates output to the next stage of the BBDL pipeline 200.

The main stage ML model 218 for a first stage 210 of the BBDL pipeline 200 receives as an input, an embedding 268 of the device information and/or other fixed or categorial information 250 that is not provided at each time step. For subsequent stages 220-230 of the BBDL pipeline 200, the main stage ML model of the previous stage is coupled to a next stage's main stage ML model and provides its output as an input to the next stage's main stage ML model, e.g., the output of main stage ML model 218 is input to the main stage ML model 228 of stage 220 and the main stage ML model 228 output is provided as input to the main stage ML model 238. In one illustrative embodiment, the main stage ML model 218, 228, 238 of each of the stages 210-230 of the BBDL pipeline 200 may be a recurrent neural network (RNN), such as a long short-term memory (LSTM) RNN.

At each stage 210-230 along the BBDL pipeline 200, the corresponding stage ML models 212-218, 222-228, and 232-238 perform similar functions as noted above but on the particular spatiotemporal, temporal, and other fixed/categorical features for the corresponding time point or time interval. The resulting output vector of the stage ML models is combined with the input from the previous stage's main stage ML model, in the current stage's ML model as feature inputs that are then processed by that stage's main stage ML model to generate a vector output that is input to the next stage's main stage ML model. This process continues through a final stage of the BBDL pipeline 200, e.g., stage 230, which then generates an output vector K 270 representing the user input over a window of time with regard to spatiotemporal, temporal, and fixed/categorical inputs. In this way, the BBDL pipeline 200 accumulates the traits of the entity (user) represented in the input over time points represented in the window of time. The resulting output vector K 270 is unique to the particular user's behavioral biometric features (or user traits) and thus, can be used to authenticate the user.

Figure 3:
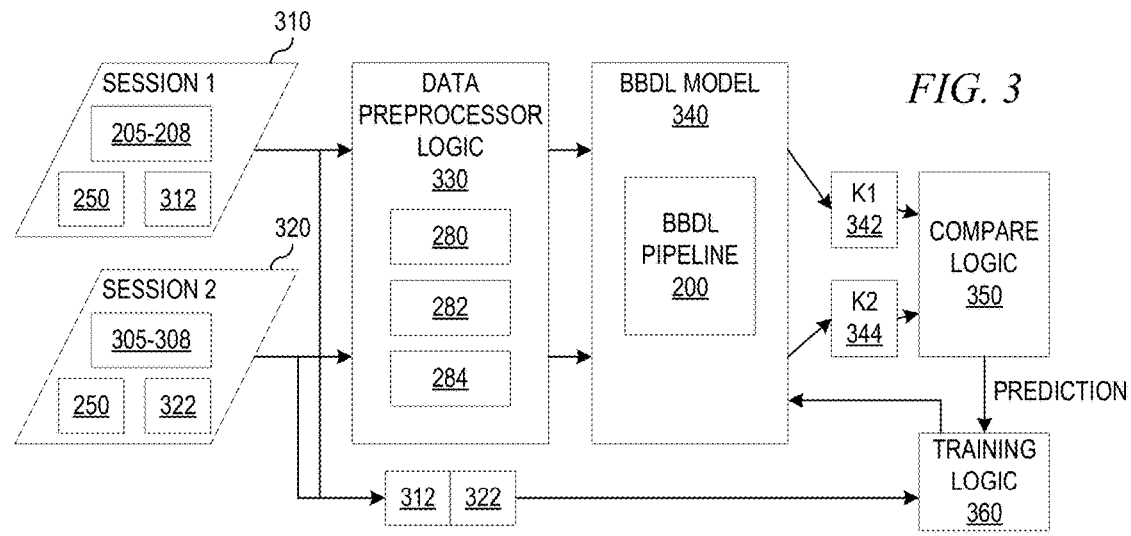
FIG. 3 is an example block diagram illustrating a high level representation of a training process for training the BBDL pipeline in accordance with one illustrative embodiment.

Training of the machine learning models of the stages of the BBDL pipeline 200 may be performed using any suitable machine learning process, e.g., supervised or unsupervised machine learning processes. FIG. 3 is an example block diagram illustrating a high level representation of a training process for training the BBDL pipeline 200 in accordance with one illustrative embodiment. With the illustrative embodiments, the machine learning process generally involves learning how to represent a particular user's behavioral biometric in terms of the spatiotemporal features, temporal features, and fixed/categorical features of their user input. The machine learning process in general involves, for each iteration of each epoch of machine learning training, obtaining a pair of user session information 310 and 320 representing user inputs over a particular period or window of time. The pair of user session information 310 and 320 involves a first set of session information 310 that corresponds to the target user, such as raw input data 205-208 obtained from various sensors and/or the computing device, as well as device information 250 for the user input device/computing device. The second session information 320 in the pair may be from the same or a different user and may include other raw input data 305-308 and corresponding device information 250. Corresponding label information 322 is obtained for the second session information 320 that indicates whether the user is the same user or a different user. In some embodiments, each user session information 310 and 320 may have label data 312, 322 specifying the identity of the user providing the user session information 310, 320, such that a comparison of the user identities can determine whether the users are the same or different for training purposes.

The first and second user session information 310, 320 are each separately processed through the model 340 comprising the BBDL pipeline 200, after preprocessing by preprocessor 330, which may include preprocessors 280-284 to generate corresponding K-dimensional output vectors 342, 344, such as K-dimensional output vector 270 in FIG. 2. The K-dimensional output vector 342 for the first session information is compared to the K-dimensional output vector 344 for the second session information to determine if the session information is classified by the model 340, comprising BBDL pipeline 200, to be the same or different users, i.e. if the session information for both sessions is determined to be sufficiently similar as to represent the same user or not.

The K-dimensional output vectors, K1 and K2, 342, 344 are compared by the comparison logic 350 to determine if the K1 and K2 output vectors 342, 344 are sufficiently similar (differences in individual values of the K1 and K2 output vectors are equal to or less than a predetermined or learned threshold) as to conclude that the user providing the user session information 310 is the same or a different user than the user providing user session information 320. The results of the comparison generate a probability value that indicates a likelihood that the user providing the user session information 310 is the same as the user providing user session information 320, which can then be compared to a threshold probability. If the calculated probability meets or exceeds the threshold probability, it is predicted that the user providing user session information 310 is the same user that provided user session information 320.

Having obtained the prediction, the accuracy of the prediction is then checked by the training logic 360 to determine if the BBDL model 340, comprising BBDL pipeline 200, generated correct results for the user session information 310, 320. For example, the labels 312, 322 for the user session information 310, 320 may be compared, or in embodiments where only the second user information 320 is labeled the label 322 may be compared to an identity of the authorized user for which the model 340 is being trained. The comparison performed by the training logic 360 determines whether the second session information is in fact from the same or different users. If the similarity prediction is incorrect based on the labels 312 and/or 322 of the user session information 310, 320, then training logic 360 adjusts the operational parameters of the machine learning models of the BBDL pipeline 200 of the BBDL model 340 so as to reduce errors (loss or cost) in the K values generated by the BBDL model 340.

It should be appreciated that the training of the BBDL model 340 and the BBDL pipeline 200 is user independent in that the BBDL pipeline 200 and BBDL model 340 are trained to accurately generate K vector outputs for instances of the same and different users. The training determines whether the BBDL pipeline 200 and BBDL model 340 properly generate K vector outputs that are sufficiently the same for the same user or sufficiently different for different users so as to make predictions of authentication of users accurate based on their behavioral biometric data present in user inputs. Rather than having to train separate machine learning models for different users, the mechanism of the illustrative embodiments can provide a single BBDL pipeline 200 and BBDL model 340 which can operate on authorized user inputs to thereby generate authorized user profiles. Thereafter, the BBDL pipeline 200 and BBDL model 340 may operate on new user input to generate K vector outputs that can then be compared to the stored authorized user profiles to authenticate the user input is from an authorized user.

Figure 4:
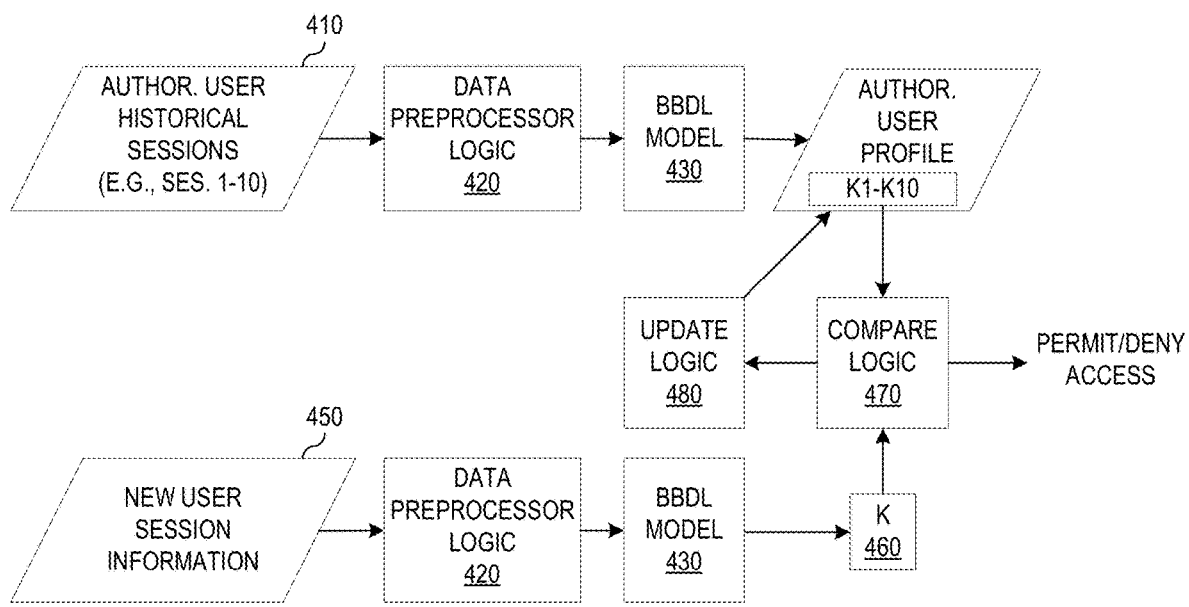
FIG. 4 is an example block diagram illustrating a high level representation of a runtime operation of a BBDL pipeline in accordance with one illustrative embodiment.

That is, once trained, the BBDL model 340, comprising the BBDL pipeline 200, may be executed on one or more user sessions of the target user to generate an authorized user profile that stores one or more K value outputs of the BBDL pipeline representing user inputs of the authorized user for the specific device. FIG. 4 is an example block diagram illustrating a high level representation of a runtime operation of a BBDL pipeline in accordance with one illustrative embodiment. As shown in FIG. 4, user historical session information 410 may be obtained for a plurality user sessions and each of these may be processed by corresponding preprocessor 420 and the BBDL pipeline 200 of the model 430 to generate K-dimensional output vectors for each session that are stored in the user profile 440. This group of user sessions, i.e. the user historical sessions, may be a continuously updated set of user historical sessions 410, e.g., the last 10 sessions may be maintained, and the corresponding user profile 440 may be dynamically updated as new sessions with the user occur. That is for each subsequent user session, the model 430 comprising BBDL pipeline 200 executes on the input data from the user session to generate a corresponding K-dimensional output vector which is then used to replace the oldest K-dimensional output vector entry in the user profile 440. Thus, a dynamic user profile 440 is maintained for the authorized user.

Whether or not new user input information for a new session is in fact from the authorized user or not may be determined in a similar manner as previously described with regard to the training of the model 340 and BBDL pipeline 200. One exception to the training operation is that, during runtime operation after training, a determination that a user for a subsequent session does not match the authorized user they purport to be, or the registered authorized user of the particular device from which the session information is obtained, then authorization to access protected resources may be denied. That is, the new user input information for the new session 450, processed via preprocessor 420 and model 430 comprising BBDL pipeline 200, results in a K-dimensional output vector 460 which may be compared to the K-dimensional output vectors stored in the user profile 440. The K-dimensional output vector 460 may be compared to each K-dimensional output vector to determine if the K-dimensional output vector 460 sufficiently matches any of the stored K-dimensional output vectors in the user profile 440. If the K-dimensional output vector 460 sufficiently matches any one of these stored K-dimensional output vectors in the user profile 440, then it is determined that the user providing the new session information 450 is the authorized user and access may be granted to the protected resources. If the K-dimensional output vector 460 does not sufficiently match any of the K-dimensional output vectors stored in the user profile, then the user providing new session information 450 is not the authorized user and thus, access to the protected resources may be denied. A determination of the new session information 450 being from the authorized user, in addition to resulting in access being permitted to the protected resources, may cause an update engine 480 to update the user profile 440 with the K-dimensional output vector 460 for this new session information 450, such as by replacing an oldest K-dimensional output vector entry in the user profile 440 if a predetermined number of K-dimensional output vector entries are present in the user profile 440 or adding a new entry if the maximum number of entries has not been reached.

Thus, as mentioned previously, the illustrative embodiments provide mechanism for implementing a spatiotemporal deep learning mechanism for behavioral biometrics. The illustrative embodiments provide a pipeline of stages comprising a set of machine learning models for each stage which classify or categorize input data for corresponding time points or time intervals with regard to spatiotemporal features, temporal features, and fixed/categorical features. In some illustrative embodiments, the spatiotemporal features are rendered as image data which is then processed by trained image analysis or computer vision analysis machine learning models, while temporal features are processed through a fully connected and/or dense layer based machine learning model. Stages of the pipeline operate on the user input data for their corresponding time point or time interval as well as the output from the previous stage in the pipeline to ultimately generate a K-dimensional output vector that represents the behavioral biometrics of the user input over the time window or time period processed by the pipeline. This can be used to generate a user profile which can then be used with subsequent user sessions to authenticate the user.

Figure 5:
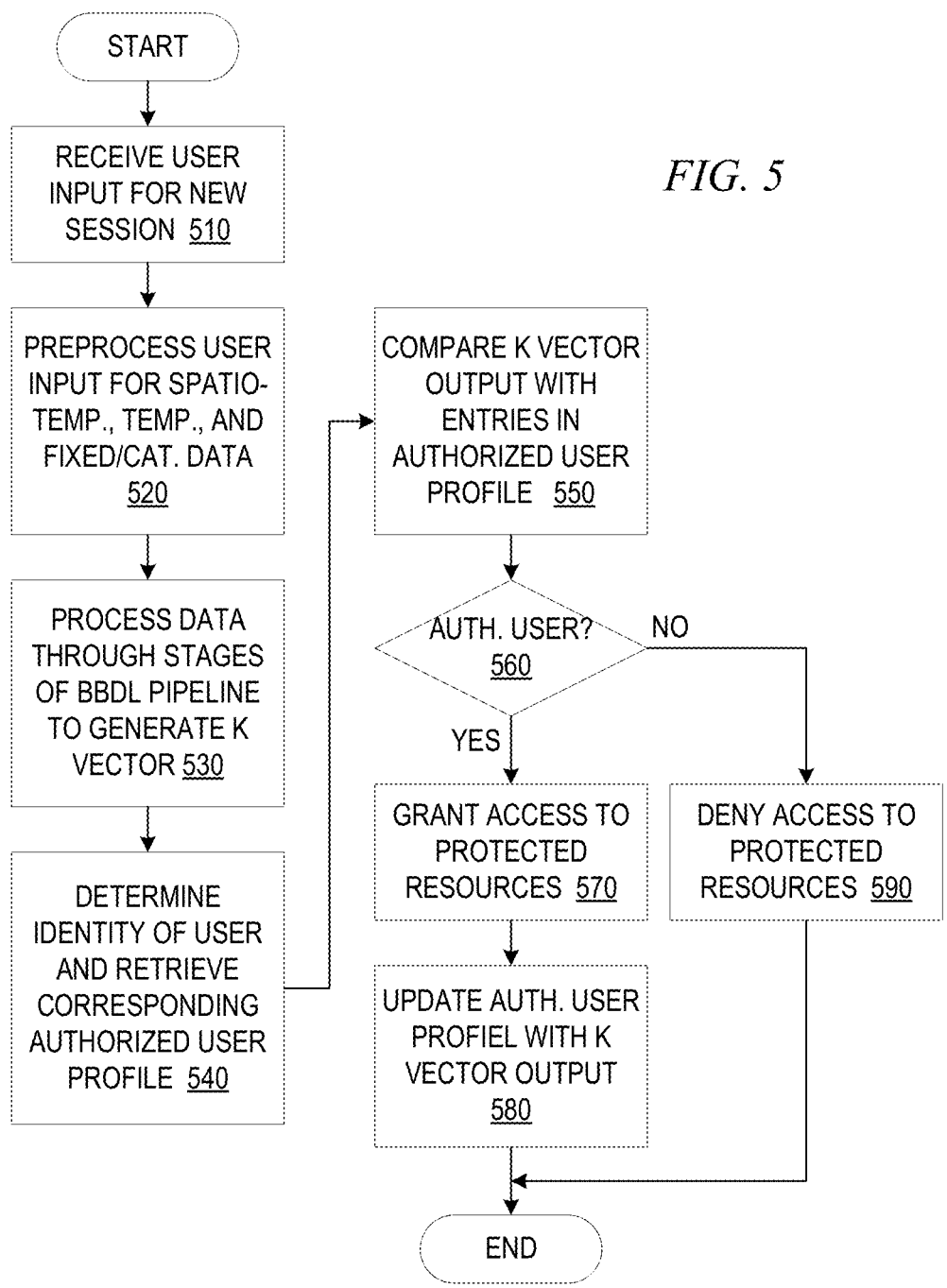
FIG. 5 is a flowchart outlining an example operation of a BBDL pipeline in accordance with one illustrative embodiment.

FIG. 5 is a flowchart outlining an example operation of a BBDL pipeline in accordance with one illustrative embodiment. The operation outlined in FIG. 5 may be performed by the BBDL pipeline as part of a runtime operation, assuming that the BBDL pipeline has been trained through the machine learning process as previously described above.

As shown in FIG. 5, the operation starts by receiving user input for a new session (step 510). The user input is preprocessed to identify and preprocess spatiotemporal features, temporal features, and fixed/categorical features present in the received user input (step 520). This preprocessing may include generation of the time×2D feature matrices/maps and the time×1D feature matrices/maps, as well as identifying the fixed/categorical features present in the received user input. The user input, for each time point of a time window represented in the user input, is processed by a corresponding stage of the BBDL pipeline and the results of the stages are combined to generate the K vector output representation of the behavioral biometrics of the user input (step 530).

The identity of an authorized user for the device is determined and a corresponding user profile for the authorized user is retrieved (step 540). The identity the user may be specified in the user input, e.g., a user identifier during a logon process or the like, which can be used to retrieve the user profile for the identified user. In other cases, the identity of the device may be used to perform a lookup operation in a registry of authorized users for the particular device.

A comparison of the K vector entries in the user profile with the K vector output representation for the user input is performed (step 550) to determine whether the vectors are sufficiently similar as to indicate the same user, or not sufficiently similar such that they represent different users (step 560). If the prediction indicates that the users are the same users, then access to protected resources is granted (step 570) and the user profile is updated with the K vector output for the user input (step 580). If the prediction indicates that the users are different, then access to the protected resources is denied (step 590). The operation then terminates.

Figure 6:
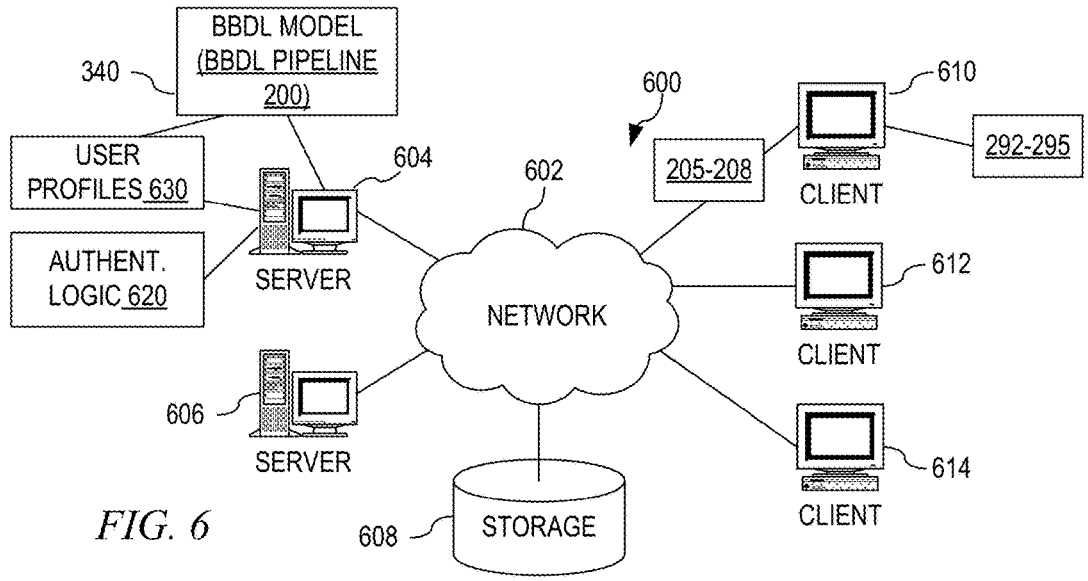
FIG. 6 is an example diagram of a distributed data processing system in which aspects of the illustrative embodiments may be implemented.
Figure 7:
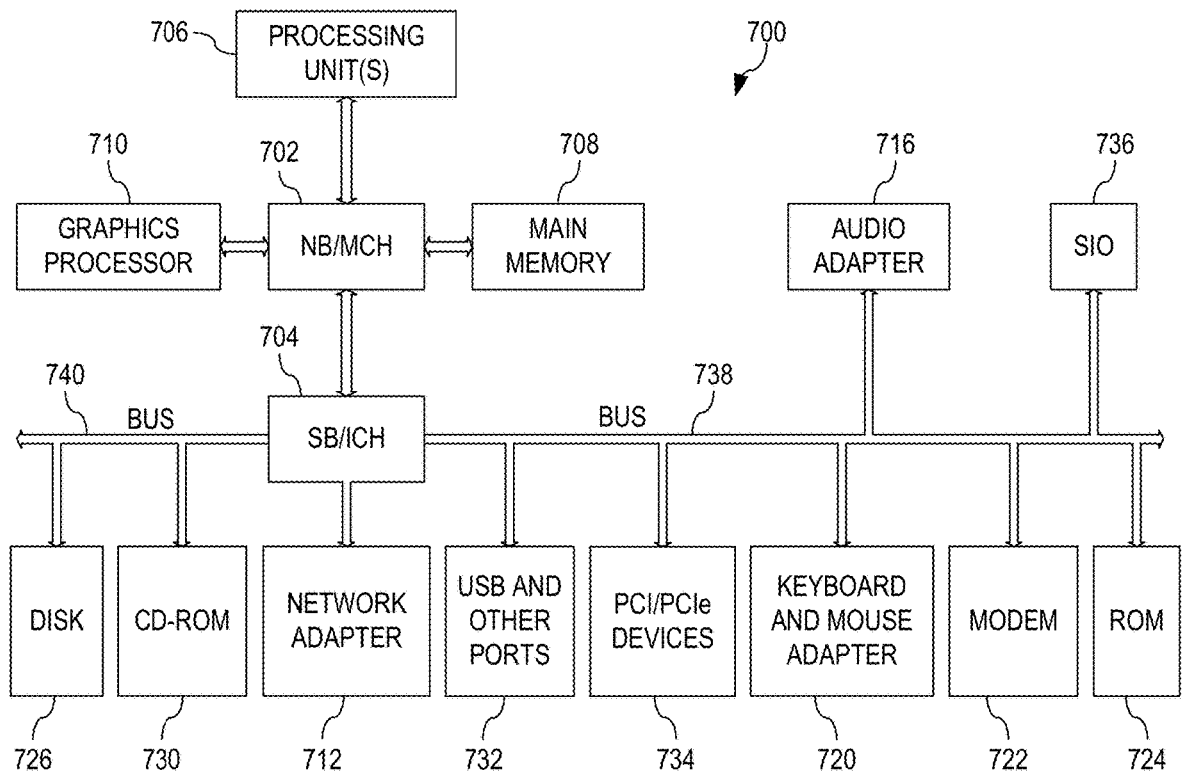
FIG. 7 is an example block diagram of a computing device in which aspects of the illustrative embodiments may be implemented.

The illustrative embodiments may be utilized in many different types of data processing environments to protect various types of computing resources, physical premises or devices, or the like, based on behavioral biometrics based on analysis of spatiotemporal features, temporal features, and fixed/categorical features of the behavior biometric inputs. The data processing environments may include single computing devices and/or distributed data processing environments. FIGS. 6 and 7 are provided hereafter as example environments in which aspects of the illustrative embodiments may be implemented. It should be appreciated that FIGS. 6 and 7 are only examples and are not intended to assert or imply any limitation with regard to the environments in which aspects or embodiments of the present invention may be implemented. Many modifications to the depicted environments may be made without departing from the spirit and scope of the present invention.

FIG. 6 depicts a pictorial representation of an example distributed data processing system in which aspects of the illustrative embodiments may be implemented. Distributed data processing system 600 may include a network of computers in which aspects of the illustrative embodiments may be implemented. The distributed data processing system 600 contains at least one network 602, which is the medium used to provide communication links between various devices and computers connected together within distributed data processing system 600. The network 602 may include connections, such as wire, wireless communication links, or fiber optic cables.

In the depicted example, server 604 and server 606 are connected to network 602 along with storage unit 608. In addition, clients 610, 612, and 614 are also connected to network 602. These clients 610, 612, and 614 may be, for example, personal computers, network computers, or the like. In the depicted example, server 604 provides data, such as boot files, operating system images, and applications to the clients 610, 612, and 614. Clients 610, 612, and 614 are clients to server 604 in the depicted example. Distributed data processing system 600 may include additional servers, clients, and other devices not shown.

In the depicted example, distributed data processing system 600 is the Internet with network 602 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 600 may also be implemented to include a number of different types of networks, such as for example, an intranet, a local area network (LAN), a wide area network (WAN), or the like. As stated above, FIG. 6 is intended as an example, not as an architectural limitation for different embodiments of the present invention, and therefore, the particular elements shown in FIG. 6 should not be considered limiting with regard to the environments in which the illustrative embodiments of the present invention may be implemented.

As shown in FIG. 6, one or more of the computing devices, e.g., server 604, may be specifically configured to implement a behavioral biometric deep learning (BBDL) model comprising a BBDL pipeline, such as the BBDL model 340 of FIG. 3 comprising BBDL pipeline 200 in FIG. 2. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 604, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates the evaluation of user inputs, such as user inputs 205-208, from user input devices of a client computing device 610, such as user input devices 205-208. The user input represents behavioral biometrics with regard to spatiotemporal features, temporal features, and fixed/categorical features. The BBDL model 340 and BBDL pipeline 200 characterize the behavioral biometrics of the user input and generate a profile of a user which can then be stored in user profiles registry 630 for authorized users for accessing protected resources. The user profiles in the user profiles registry 630 may be compared to characterizations of behavior biometrics of subsequent user inputs to thereby authenticate users in subsequent sessions. The authentication logic 620, such as the comparison and update logic 470 and 480 in FIG. 4, for example, compares the characterization of the behavioral biometrics to authenticate the user and if the user is not an authentic user, access to protected resources may be denied. If the user is an authenticated user, then the user may be granted access to the protected resources, and in some embodiments, the profile for the authenticated user may be updated by the authentication logic 620, comprising update logic 470 for example, with the characterization of the session user input to thereby dynamically update the user profile.

In some embodiments, the user input may be received from sensors of user interface devices 292-295 which may be part of a client computing system 610, and other data characterizing the client computing device 610 itself. The user input and/or device information may be provided via the network 602 to the server 604 implementing the BBDL pipeline 200 which then processes the user input to authenticate the user. The server 604 may then return an output authorizing or denying access to the protected resources. It should be appreciated that while a client/server configuration is shown in FIG. 6, the illustrative embodiments are not limited to such. Moreover, the client computing devices 610-614 may take many different forms, such as client computers, tablet computers, smartphones, other smart devices, Internet of Things (IoT) devices, and the like. In short, any computing device having user input interfaces through which behavioral biometric based user input may be received and provided to the BBDL pipeline and BBDL model may be used without departing from the spirit and scope of the present invention.

As noted above, the mechanisms of the illustrative embodiments utilize specifically configured computing devices, or data processing systems, to perform the operations for implementing the BBDL pipeline 200 and performing behavioral biometric deep learning based authentication of user inputs. These computing devices, or data processing systems, may comprise various hardware elements which are specifically configured, either through hardware configuration, software configuration, or a combination of hardware and software configuration, to implement one or more of the systems/subsystems described herein. FIG. 7 is a block diagram of just one example data processing system in which aspects of the illustrative embodiments may be implemented. Data processing system 700 is an example of a computer, such as server 604 in FIG. 6, in which computer usable code or instructions implementing the processes and aspects of the illustrative embodiments of the present invention may be located and/or executed so as to achieve the operation, output, and external effects of the illustrative embodiments as described herein.

In the depicted example, data processing system 700 employs a hub architecture including north bridge and memory controller hub (NB/MCH) 702 and south bridge and input/output (I/O) controller hub (SB/ICH) 704. Processing unit 706, main memory 708, and graphics processor 710 are connected to NB/MCH 702. Graphics processor 710 may be connected to NB/MCH 702 through an accelerated graphics port (AGP).

In the depicted example, local area network (LAN) adapter 712 connects to SB/ICH 704. Audio adapter 716, keyboard and mouse adapter 720, modem 722, read only memory (ROM) 724, hard disk drive (HDD) 726, CD-ROM drive 730, universal serial bus (USB) ports and other communication ports 732, and PCI/PCIe devices 734 connect to SB/ICH 704 through bus 738 and bus 740. PCI/PCIe devices may include, for example, Ethernet adapters, add-in cards, and PC cards for notebook computers. PCI uses a card bus controller, while PCIe does not. ROM 724 may be, for example, a flash basic input/output system (BIOS).

HDD 726 and CD-ROM drive 730 connect to SB/ICH 704 through bus 740. HDD 726 and CD-ROM drive 730 may use, for example, an integrated drive electronics (IDE) or serial advanced technology attachment (SATA) interface. Super I/O (SIO) device 736 may be connected to SB/ICH 704.

An operating system runs on processing unit 706. The operating system coordinates and provides control of various components within the data processing system 700 in FIG. 7. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 700.

As a server, data processing system 700 may be, for example, an IBM eServer™ System p® computer system, Power™ processor based computer system, or the like, running the Advanced Interactive Executive (AIX®) operating system or the LINUX® operating system. Data processing system 700 may be a symmetric multiprocessor (SMP) system including a plurality of processors in processing unit 706. Alternatively, a single processor system may be employed.

Instructions for the operating system, the object-oriented programming system, and applications or programs are located on storage devices, such as HDD 726, and may be loaded into main memory 708 for execution by processing unit 706. The processes for illustrative embodiments of the present invention may be performed by processing unit 706 using computer usable program code, which may be located in a memory such as, for example, main memory 708, ROM 724, or in one or more peripheral devices 726 and 730, for example.

A bus system, such as bus 738 or bus 740 as shown in FIG. 7, may be comprised of one or more buses. Of course, the bus system may be implemented using any type of communication fabric or architecture that provides for a transfer of data between different components or devices attached to the fabric or architecture. A communication unit, such as modem 722 or network adapter 712 of FIG. 7, may include one or more devices used to transmit and receive data. A memory may be, for example, main memory 708, ROM 724, or a cache such as found in NB/MCH 702 in FIG. 7.

As mentioned above, in some illustrative embodiments the mechanisms of the illustrative embodiments may be implemented as application specific hardware, firmware, or the like, application software stored in a storage device, such as HDD 726 and loaded into memory, such as main memory 708, for executed by one or more hardware processors, such as processing unit 706, or the like. As such, the computing device shown in FIG. 7 becomes specifically configured to implement the mechanisms of the illustrative embodiments and specifically configured to perform the operations and generate the outputs described herein with regard to the BBDL pipeline 200 in FIG. 2 and authentication mechanisms based on the characterizations of user inputs generated by the BBDL pipeline 200.

Those of ordinary skill in the art will appreciate that the hardware in FIGS. 6 and 7 may vary depending on the implementation. Other internal hardware or peripheral devices, such as flash memory, equivalent non-volatile memory, or optical disk drives and the like, may be used in addition to or in place of the hardware depicted in FIGS. 6 and 7. Also, the processes of the illustrative embodiments may be applied to a multiprocessor data processing system, other than the SMP system mentioned previously, without departing from the spirit and scope of the present invention.

Moreover, the data processing system 700 may take the form of any of a number of different data processing systems including client computing devices, server computing devices, a tablet computer, laptop computer, telephone or other communication device, a personal digital assistant (PDA), or the like. In some illustrative examples, data processing system 700 may be a portable computing device that is configured with flash memory to provide non-volatile memory for storing operating system files and/or user-generated data, for example. Essentially, data processing system 700 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, comprising at least one processor and at least one memory, the at least one memory comprising instructions executed by the at least one processor to specifically configure the at least one processor to implement a behavioral biometrics deep learning (BBDL) pipeline comprising a plurality of stages of machine learning computer models that operate to implement the method comprising:

receiving, from one or more sensors, spatiotemporal input data corresponding to an input associated with an entity over a predetermined time window comprising a plurality of time intervals, each time interval having a corresponding subset of the spatiotemporal input data, wherein the spatiotemporal input data comprises input data that is both spatially dependent with regard to a physical area monitored by at least one of the one or more sensors, and time dependent;

for each time interval in the plurality of time intervals, processing, by one or more machine learning computer models of a corresponding stage in the plurality of stages, a subset of the spatiotemporal input data corresponding to the time interval to generate an output vector having values indicative of an internal representation of spatiotemporal traits of the entity represented in the subset of the spatiotemporal input data;

accumulating output vectors, across the plurality of stages of the BBDL pipeline, to generate a final output vector comprising final output vector values indicative of the spatiotemporal traits of the entity represented in the spatiotemporal input data; and authenticating, by the data processing system, the entity based on the final output vector, wherein:

each stage of the BBDL pipeline comprises combination logic that operates to combine output vectors of different logic of the stage and generate a combination output vector that is input to a main stage machine learning computer model of the stage, each main stage machine learning computer model of each stage of the BBDL pipeline processes a corresponding combination output vector of its corresponding stage along with an input from a previous stage of the BBDL pipeline to generate a stage output vector, accumulating output vectors, across the plurality of stages of the BBDL pipeline, to generate a final output vector comprises, for each stage, outputting the stage output vector as an input to a next stage in the BBDL pipeline, and a stage output vector of a main stage machine learning computer model of a last stage of the BBDL pipeline is the final output vector.

2. The method of claim 1, wherein authenticating the entity comprises:

comparing the final output vector to at least one previously generated output vector, generated by the BBDL pipeline, stored in a user profile for an authorized user to determine a probability that the final output vector represents spatiotemporal traits of a user matching spatiotemporal traits of the authorized user; and controlling access to protected resources in response to results of the comparison.

3. The method of claim 1, wherein each stage of the BBDL pipeline comprises an image processing machine learning computer model, and wherein, for each stage of the BBDL pipeline, processing the subset of spatiotemporal input data corresponding to the time interval comprises:

processing the subset of spatiotemporal input data to transform spatiotemporal features in the subset of spatiotemporal input data into an image; and performing, by the image processing machine learning computer model of the stage, image analysis on the image to generate a first vector output.

4. The method of claim 3, wherein each stage of the BBDL pipeline comprises a fully connected neural network machine learning computer model, and wherein, for each stage of the BBDL pipeline, processing the subset of spatiotemporal input data corresponding to the time interval comprises:

processing the subset of spatiotemporal input data to identify temporal features in the subset of spatiotemporal input data; and processing, by the fully connected neural network machine learning model of the stage, the temporal features to generate a second vector output.

5. The method of claim 4, wherein each stage of the BBDL pipeline comprises fixed/categorical data embedding logic, and wherein, for each stage of the BBDL pipeline, processing the subset of spatiotemporal input data corresponding to the time interval comprises:

processing the subset of spatiotemporal input data to identify fixed/categorical features in the subset of spatiotemporal input data; and processing, by the fixed/categorical data embedding logic of the stage, the fixed/categorical features to generate a third vector output.

6. The method of claim 5, wherein for each stage of the BBDL pipeline, the corresponding combination logic operates to combine the first output vector, second output vector, and third output vector to generate the combination output vector that is input to the main stage machine learning computer model of the stage.

7. The method of claim 1, wherein embedded device information is input to a main stage machine learning computer model of the first stage of the BBDL pipeline, and wherein the main stage machine learning computer model processes a combination output vector, which combines output vectors of the one or more machine learning computer models of the first stage, along with the embedded device information to generate a stage output vector for the first stage.

8. A computer program product comprising a computer readable storage medium having a computer readable program stored therein, wherein the computer readable program, when executed on a computing device, causes the computing device to implement a behavioral biometrics deep learning (BBDL) pipeline comprising a plurality of stages of machine learning computer models that operate to:

receive, from one or more sensors, spatiotemporal input data corresponding to an input associated with an entity over a predetermined time window comprising a plurality of time intervals, each time interval having a corresponding subset of the spatiotemporal input data, wherein the spatiotemporal input data comprises input data that is both spatially dependent with regard to a physical area monitored by at least one of the one or more sensors, and time dependent;

for each time interval in the plurality of time intervals, process, by one or more machine learning computer models of a corresponding stage in the plurality of stages, a subset of the spatiotemporal input data corresponding to the time interval to generate an output vector having values indicative of an internal representation of spatiotemporal traits of the entity represented in the subset of the spatiotemporal input data;

accumulate output vectors, across the plurality of stages of the BBDL pipeline, to generate a final output vector comprising final output vector values indicative of the spatiotemporal traits of the entity represented in the spatiotemporal input data; and authenticate, by the data processing system, the entity based on the final output vector, wherein:
each stage of the BBDL pipeline comprises combination logic that operates to combine output vectors of different logic of the stage and generate a combination output vector that is input to a main stage machine learning computer model of the stage,
each main stage machine learning computer model of each stage of the BBDL pipeline processes a corresponding combination output vector of its corresponding stage along with an input from a previous stage of the BBDL pipeline to generate a stage output vector,
accumulating output vectors, across the plurality of stages of the BBDL pipeline, to generate a final output vector comprises, for each stage, outputting the stage output vector as an input to a next stage in the BBDL pipeline, and
a stage output vector of a main stage machine learning computer model of a last stage of the BBDL pipeline is the final output vector.

9. The computer program product of claim 8, wherein authenticating the entity comprises:
comparing the final output vector to at least one previously generated output vector, generated by the BBDL pipeline, stored in a user profile for an authorized user to determine a probability that the final output vector represents spatiotemporal traits of a user matching spatiotemporal traits of the authorized user; and
controlling access to protected resources in response to results of the comparison.

10. The computer program product of claim 8, wherein each stage of the BBDL pipeline comprises an image processing machine learning computer model, and wherein, for each stage of the BBDL pipeline, processing the subset of spatiotemporal input data corresponding to the time interval comprises:
processing the subset of spatiotemporal input data to transform spatiotemporal features in the subset of spatiotemporal input data into an image; and
performing, by the image processing machine learning computer model of the stage, image analysis on the image to generate a first vector output.

11. The computer program product of claim 10, wherein each stage of the BBDL pipeline comprises a fully connected neural network machine learning computer model, and wherein, for each stage of the BBDL pipeline, processing the subset of spatiotemporal input data corresponding to the time interval comprises:
processing the subset of spatiotemporal input data to identify temporal features in the subset of spatiotemporal input data; and
processing, by the fully connected neural network machine learning model of the stage, the temporal features to generate a second vector output.

12. The computer program product of claim 11, wherein each stage of the BBDL pipeline comprises fixed/categorical data embedding logic, and wherein, for each stage of the BBDL pipeline, processing the subset of spatiotemporal input data corresponding to the time interval comprises:
processing the subset of spatiotemporal input data to identify fixed/categorical features in the subset of spatiotemporal input data; and
processing, by the fixed/categorical data embedding logic of the stage, the fixed/categorical features to generate a third vector output.

13. The computer program product of claim 12, wherein for each stage of the BBDL pipeline, the corresponding combination logic operates to combine the first output vector, second output vector, and third output vector to generate the combination output vector that is input to the main stage machine learning computer model of the stage.

14. The computer program product of claim 8, wherein embedded device information is input to a main stage machine learning computer model of the first stage of the BBDL pipeline, and wherein the main stage machine learning computer model processes a combination output vector, which combines output vectors of the one or more machine learning computer models of the first stage, along with the embedded device information to generate a stage output vector for the first stage.

15. An apparatus comprising:
at least one processor; and
at least one memory coupled to the at least one processor, wherein the at least one memory comprises instructions which, when executed by the at least one processor, cause the at least one processor to implement a behavioral biometrics deep learning (BBDL) pipeline comprising a plurality of stages of machine learning computer models that operate to:
receive, from one or more sensors, spatiotemporal input data corresponding to an input associated with an entity over a predetermined time window comprising a plurality of time intervals, each time interval having a corresponding subset of the spatiotemporal input data, wherein the spatiotemporal input data comprises input data that is both spatially dependent with regard to a physical area monitored by at least one of the one or more sensors, and time dependent;
for each time interval in the plurality of time intervals, process, by one or more machine learning computer models of a corresponding stage in the plurality of stages, a subset of the spatiotemporal input data corresponding to the time interval to generate an output vector having values indicative of an internal representation of spatiotemporal traits of the entity represented in the subset of the spatiotemporal input data;
accumulate output vectors, across the plurality of stages of the BBDL pipeline, to generate a final output vector comprising final output vector values indicative of the spatiotemporal traits of the entity represented in the spatiotemporal input data; and
authenticate, by the data processing system, the entity based on the final output vector, wherein:
each stage of the BBDL pipeline comprises combination logic that operates to combine output vectors of different logic of the stage and generate a combination output vector that is input to a main stage machine learning computer model of the stage,
each main stage machine learning computer model of each stage of the BBDL pipeline processes a corresponding combination output vector of its corresponding stage along with an input from a previous stage of the BBDL pipeline to generate a stage output vector,
accumulating output vectors, across the plurality of stages of the BBDL pipeline, to generate a final output vector comprises, for each stage, outputting the stage output vector as an input to a next stage in the BBDL pipeline, and
a stage output vector of a main stage machine learning computer model of a last stage of the BBDL pipeline is the final output vector.

16. The method of claim 1, wherein the output vectors are accumulated across the plurality of stages of the BBDL pipeline at least by, for each stage in the plurality of stages of the BBDL pipeline, other than a first stage in the BBDL pipeline, processing an output from a previous stage in the BBDL pipeline, as input data along with the processing of the subset of the spatiotemporal input data corresponding to the time interval corresponding to the stage.

17. The method of claim 1, wherein for each stage in the plurality of stages of the BBDL pipeline, the one or more machine learning computer models comprises a plurality of machine learning computer models, each machine learning computer model operating on a different aspect of the subset of spatiotemporal input data and outputting a corresponding vector output, and wherein combinational logic of the stage combines the vector outputs of the plurality of machine learning computer models to provide an input to a main stage machine learning computer model of the stage.

18. The method of claim 1, wherein, for each stage in the plurality of stages of the BBDL pipeline, the one or more machine learning computer models corresponding to the stage comprises an image processing machine learning computer model that processes an image corresponding to the subset of spatiotemporal input data, a neural network machine learning computer model that processes temporal features of the subset of spatiotemporal input data, and categorical data embedding logic that processes categorical features in the subset of spatiotemporal input data, and wherein vector outputs from each of the image processing machine learning computer model, neural network machine learning computer model, and categorical data embedding logic are combined to provide an input to a main stage machine learning model for the stage.

* * * * *